(12) United States Patent
Unnimadhava Kurup Soudamini Amma et al.

(10) Patent No.: US 12,181,708 B2
(45) Date of Patent: Dec. 31, 2024

(54) OPTICAL FIBER FOR SENSING AN ANALYTE, METHODS OF FORMING AND USING THE SAME

(71) Applicants: Agency for Science, Technology and Research, Singapore (SG); Centre National de la Recherche Scientifique, Paris (FR); Université de Limoges, Limoges (FR)

(72) Inventors: Dinish Unnimadhava Kurup Soudamini Amma, Singapore (SG); Malini Olivo, Singapore (SG); Georges Humbert, Paris (FR); Flavien Beffara, Singapore (SG); Jean-Louis Auguste, Paris (FR)

(73) Assignees: Agency for Science, Technology and Research, Singapore (SG); Centre National de la Recherche Scientifique (FR); Université de Limoges (FR)

( * ) Notice: Subject to any disclaimer, the term of this patent is extended or adjusted under 35 U.S.C. 154(b) by 490 days.

(21) Appl. No.: 17/594,359

(22) PCT Filed: Mar. 31, 2020

(86) PCT No.: PCT/SG2020/050197
§ 371 (c)(1),
(2) Date: Oct. 13, 2021

(87) PCT Pub. No.: WO2020/214088
PCT Pub. Date: Oct. 22, 2020

(65) Prior Publication Data
US 2022/0187532 A1 Jun. 16, 2022

(30) Foreign Application Priority Data

Apr. 17, 2019 (SG) .......................... 10201903472R

(51) Int. Cl.
*G02B 6/02* (2006.01)
*G01N 21/552* (2014.01)
(Continued)

(52) U.S. Cl.
CPC ....... *G02B 6/02328* (2013.01); *G01N 21/648* (2013.01); *G01N 21/658* (2013.01); *G02B 6/032* (2013.01); *G01N 2021/6484* (2013.01)

(58) Field of Classification Search
CPC .... G02B 6/02328; G02B 6/3624; G02B 6/32; G01N 21/648; G01N 21/658; G01N 21/553; G01N 2021/6484; G01N 2201/088
See application file for complete search history.

(56) References Cited

U.S. PATENT DOCUMENTS

2010/0247046 A1\* 9/2010 Dong ............... B29D 11/00663
264/1.28
2016/0252673 A1 9/2016 Fini et al.

FOREIGN PATENT DOCUMENTS

CN 103616362 A \* 3/2014
CN 108318965 A 7/2018
(Continued)

OTHER PUBLICATIONS

F. Benabid, "Hollow core photonic crystal fiber optical guidance and applications," in 2013 Conference on Lasers and Electro-Optics Pacific Rim, (Optica Publishing Group, 2013), paper TuA2_3. (Year: 2013).\*
(Continued)

*Primary Examiner* — Ryan A Lepisto
*Assistant Examiner* — Erin D Chiem
(74) *Attorney, Agent, or Firm* — Shackelford, McKinley & Norton, LLP

(57) ABSTRACT

Various embodiments may provide an optical fiber for sensing an analyte. The optical fiber may include a dielectric
(Continued)

core wall defining a hollow space. The optical fiber may also include a cladding layer surrounding the dielectric core wall and spaced apart from the dielectric core wall. The optical fiber may further include a plurality of supports extending from the cladding layer to the dielectric core wall. A thickness of the dielectric core wall may be greater than a thickness of each of the plurality of supports. The dielectric core wall may be configured to carry an optical light for sensing the analyte.

19 Claims, 37 Drawing Sheets

(51) Int. Cl.
  *G01N 21/64* (2006.01)
  *G01N 21/65* (2006.01)
  *G02B 6/032* (2006.01)
  *G02B 6/36* (2006.01)

(56) References Cited

FOREIGN PATENT DOCUMENTS

| CN | 108919417 | A | | 11/2018 |
|---|---|---|---|---|
| GB | 2408812 | A | | 6/2005 |
| GB | 2408812 | A2 | * | 6/2005 |
| WO | 2011155901 | A1 | | 12/2011 |
| WO | 2018137039 | A1 | | 8/2018 |
| WO | 2019004944 | A1 | | 1/2019 |

OTHER PUBLICATIONS

Xin Jiang et al., "Supercontinuum generation in ZBLAN glass photonic crystal fiber with six nanobore cores," Opt. Lett. 41, 42 (Year: 2016).*
International Search Report for International Application No. PCT/SG2020/050197 dated Aug. 17, 2020, pp. 1-4.
Written Opinion of the International Searching Authority for International Application No. PCT/SG2020/050197 dated Aug. 17, 2020, pp. 1-4.
Guo et al., "Ultrasensitive Optofluidic Surface-Enhanced Raman Scattering Detection with Flow-Through Multihole Capillaries," ACS Nano, vol. 6, No. 1, 2012, pp. 381-388.
Afshar V. et al., "Enhancement of Fluoresence-Based Sensing Using Microstructured Optical Fibres," Optics Express, vol. 15, No. 26, Dec. 24, 2007, pp. 17891-17901.
Gerome et al., "Simplified Hollow-Core Photonic Crystal Fiber," Optics Letters, vol. 35, No. 8, Apr. 15, 2010, pp. 1157-1159.
Chen et al., "Advantage of Multi-Mode Sapphire Optical Fiber for Evanescent-Field SERS Sensing," Optics Letters, vol. 39, No. 20, Oct. 15, 2014, pp. 5822-5825.
Zhang et al., "Side-Channel Photonic Crystal Fiber for Surface Enhanced Raman Scattering Sensing," Sensors and Actuators B: Chemical, vol. 223, 2016, pp. 195-201.
Passaro et al., "All-Silica Hollow-Core Microstructured Bragg Fibers for Biosensor Application," IEEE Sensors Journal, vol. 8, No. 7, Jul. 2008, pp. 1280-1286.
Yan et al., "Novel Index-Guided Photonic Crystal Fiber Surface-Enhanced Raman Scattering Probe," Optics Express, vol. 16, No. 11, May 26, 2008, pp. 8300-8305.
Geng et al., "A Simplified Hollow-Core Photonic Crystal Fiber SERS Probe with a Fully Filled Photoreduction Silver Nanoprism," Sensors, vol. 18, No. 6, 2018, pp. 1-8.
Tsiminis et al., "Single-Ring Hollow Core Optical Fibers Made by Glass Billet Extrusion for Raman Sensing," Optics Express, vol. 24, No. 6, Mar. 21, 2016, pp. 5911-5917.
Giglio et al., "Low-Loss and Single-Mode Tapered Hollow-Core Waveguides Optically Coupled with Interband and Quantum Cascade Lasers," Optical Engineering, vol. 57, No. 1, Jan. 2018, pp. 1-7.
Sharma et al., "Fiber-Optic Sensors Based on Surface Plasmon Resonance: A Comprehensive Review," IEEE Sensors Journal, vol. 7, No. 8, Aug. 2007, pp. 1118-1129.
Perumal et al., "Retinoic Acid is Abundantly Detected in Different Depots of Adipose Tissue by SERS," Adipocyte, vol. 5, No. 4, 2016, pp. 378-383.

* cited by examiner

FIG. 13
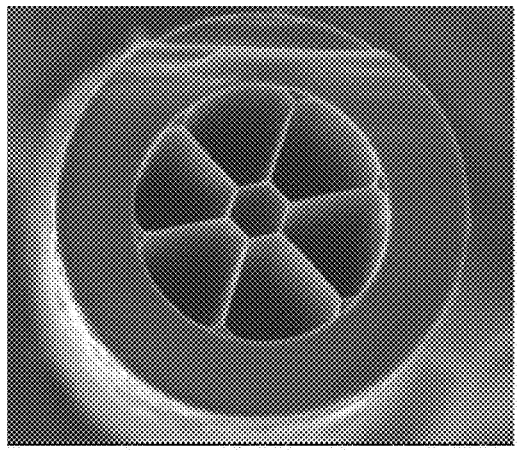
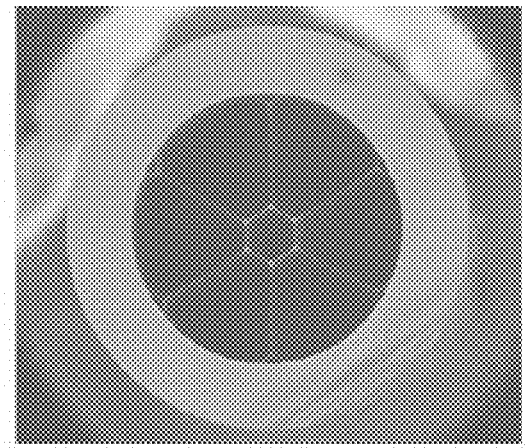
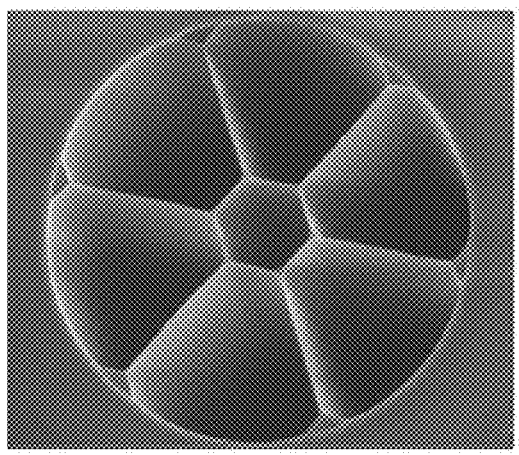
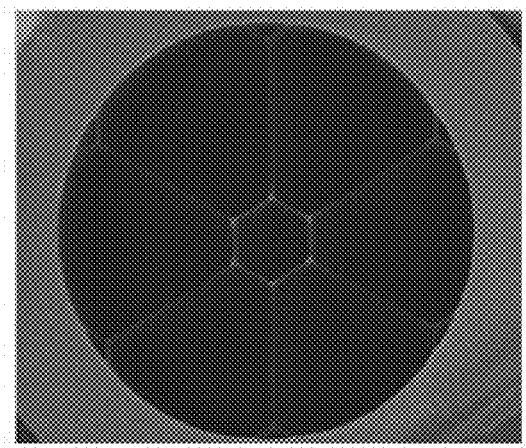
$D_{fibre}$ ~ 295 µm
$D_{core}$ ~ 40 µm
$T_{core}$ ~ 400 nm
$D_{fibre}$ ~ 390 µm
$D_{core}$ ~ 50 µm
$T_{core}$ ~ 500 nm

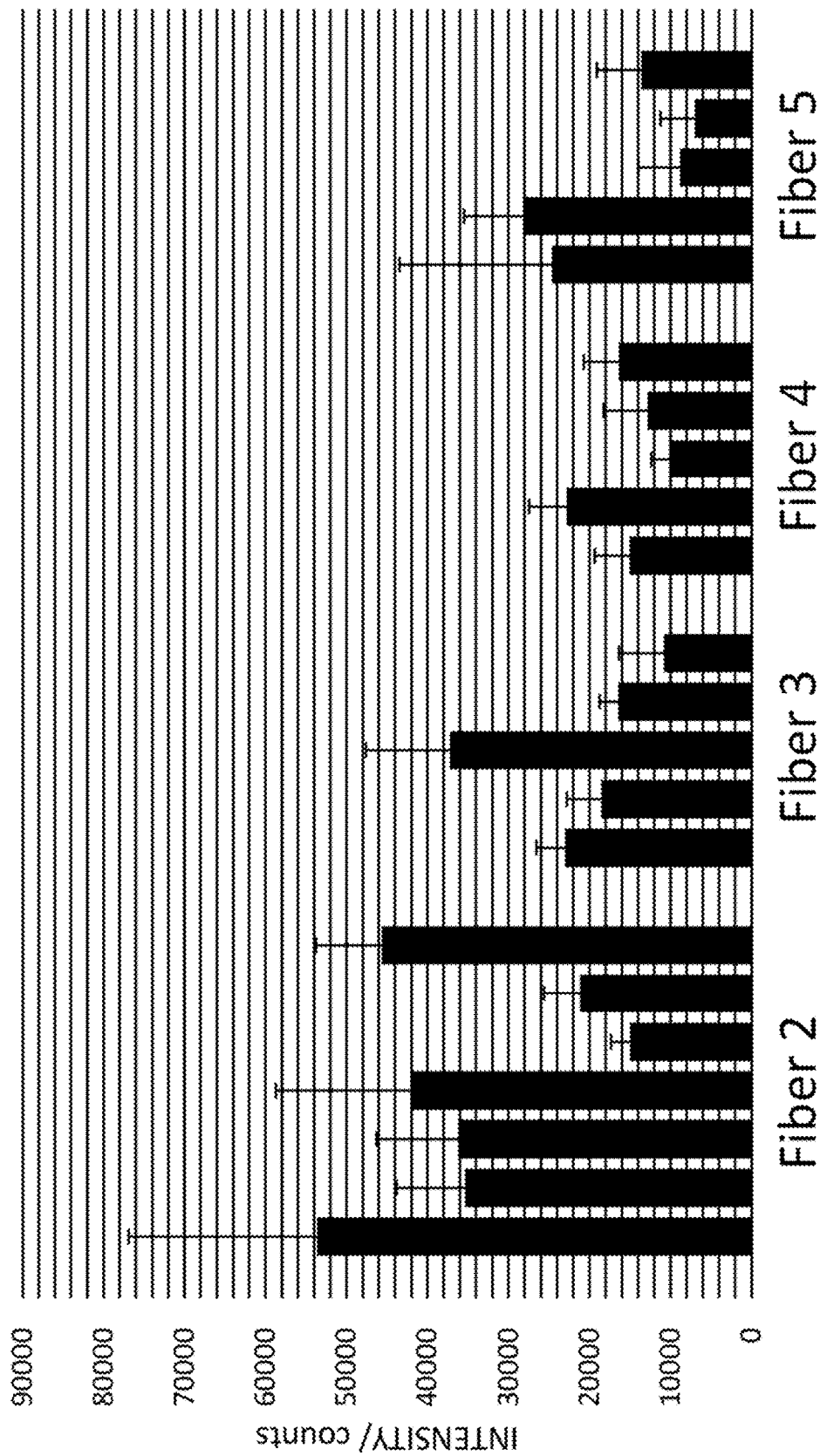

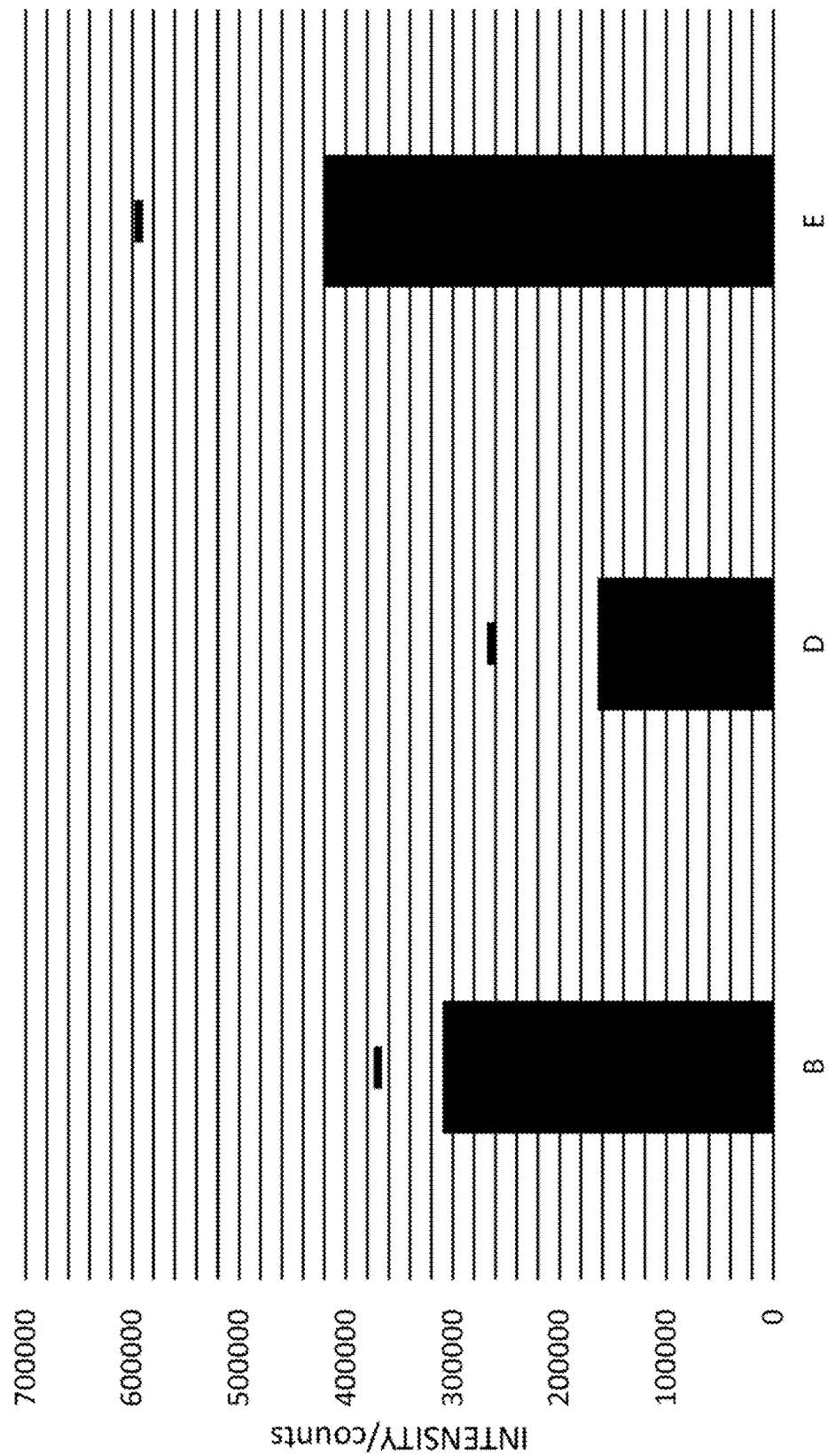

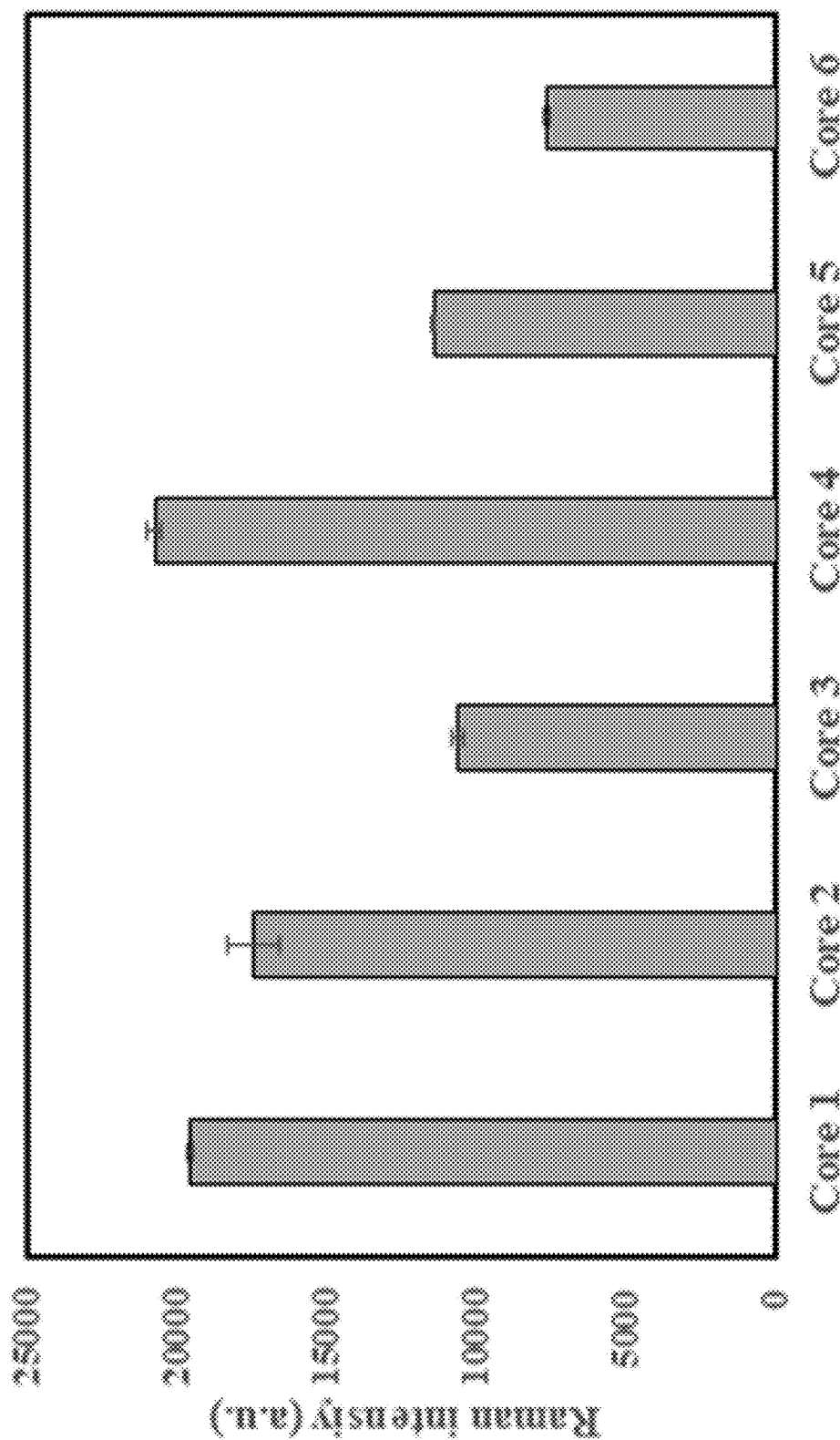

| Fiber | Outside diameter (μm) | Ring diameter (μm) | Core thickness (μm) |
|---|---|---|---|
| 1 | 290 | 20.5 | 3.5 |

| Fiber | Outside diameter (μm) | Ring diameter (μm) | Core thickness (μm) |
|---|---|---|---|
| 2 | 290 | 26.5 | 1.8 |

| Fiber | Outside diameter (μm) | Ring diameter (μm) | Core thickness (μm) |
|---|---|---|---|
| 3 | 290 | 27 | 1.6 |

| Fiber | Outside diameter (μm) | Ring diameter (μm) | Core thickness (μm) |
|---|---|---|---|
| 4 | 290 | 29 | 1.1 |

| Fiber | Outside diameter (μm) | Ring diameter (μm) | Core thickness (μm) |
|---|---|---|---|
| 5 | 290 | 27 | 0.94 |

| Fiber | Outside diameter (μm) | Ring diameter (μm) | Core thickness (μm) |
|---|---|---|---|
| 6 | 297 | 40 | 0.4 |

| Fiber | Outside diameter (μm) | Ring diameter (μm) | Core thickness (μm) |
|---|---|---|---|
| 7 | 390 | 49 | 0.5 |

| Fiber | Outside diameter (μm) | Ring diameter (μm) | Core thickness (μm) |
|---|---|---|---|
| 8 | 620 | 96 | 0.4 |

| Fiber | Outside diameter (μm) | Ring diameter (μm) | Core thickness (μm) |
|---|---|---|---|
| 9 | 580 | 90 | 0.6 |

OPTICAL FIBER FOR SENSING AN ANALYTE, METHODS OF FORMING AND USING THE SAME

CROSS-REFERENCE TO RELATED APPLICATION

This application claims the benefit of priority of Singapore application No. 10201903472R filed on Apr. 17, 2019, the contents of it being hereby incorporated by reference in its entirety for all purposes.

TECHNICAL FIELD

Various aspects of this disclosure relate to an optical fiber for sensing an analyte. Various aspects of this disclosure relate to a method of forming an optical fiber for sensing an analyte. Various aspects of this disclosure relate to a method of using an optical fiber for sensing an analyte.

BACKGROUND

Optical fibers have been used for sensing analytes in various detection methods such as absorption spectroscopy, fluorescence-based detection, Raman based detection (including surface enhanced Raman spectroscopy (SERS) and similar sensitivity enhanced techniques.

SUMMARY

Various embodiments may provide an optical fiber for sensing an analyte. The optical fiber may include a dielectric core wall defining a hollow space. The optical fiber may also include a cladding layer surrounding the dielectric core wall and spaced apart from the dielectric core wall. The optical fiber may further include a plurality of supports extending from the cladding layer to the dielectric core wall. A thickness of the dielectric core wall may be greater than a thickness of each of the plurality of supports. The dielectric core wall may be configured to carry an optical light for sensing the analyte.

Various embodiments may provide an optical fiber for sensing an analyte. The method may include forming a dielectric core wall defining a hollow space. The method may also include forming a cladding layer surrounding the dielectric core wall and spaced apart from the dielectric core wall. The method may further include forming a plurality of supports extending from the cladding layer to the dielectric core wall. A thickness of the dielectric core wall may be greater than a thickness of each of the plurality of supports. The dielectric core wall may be configured to carry an optical light for sensing the analyte.

Various embodiments may relate to a method of using an optical fiber for sensing an analyte. The method may include providing the analyte to the optical fiber. The optical fiber may include a dielectric core wall defining a hollow space, a cladding layer surrounding the dielectric core wall and spaced apart from the dielectric core wall, and a plurality of supports extending from the cladding layer to the dielectric core wall. The method may also include providing an optical light to the dielectric core wall which carries the optical light for sensing the analyte. The method may also include determining (e.g. analyzing and/or measuring) the optical light at an output of the optical fiber. A thickness of the dielectric core wall may be greater than a thickness of each of the plurality of supports.

BRIEF DESCRIPTION OF THE DRAWINGS

The invention will be better understood with reference to the detailed description when considered in conjunction with the non-limiting examples and the accompanying drawings, in which:

FIG. 13 shows scanning electron microscopy (SEM) images of traverse cross-section of the optical fibers according to various embodiments.

FIG. 17A is a plot comparing the surface enhanced Raman spectroscopy (SERS) signal intensity (counts) of Aminothiophenol (ATP) measured at 1079 cm$^{-1}$ in backscattered configuration for various ring core optical fibers according to various embodiments.

FIG. 17B is a plot comparing the surface enhanced Raman spectroscopy (SERS) signal intensity (counts) of Aminothiophenol (ATP) measured at 1079 cm$^{-1}$ in backscattered configuration for various ring core optical fibers tapered at one end according to various embodiments.

FIG. 19B is a plot comparing the Raman intensities (in arbitrary units or a.u.) using 50× objective at different "cores" of the optical fiber according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or optical fiber are analogously valid for the other methods or optical fibers. Similarly, embodiments described in the context of a method are analogously valid for an optical fiber, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The device as described herein may be operable in various orientations, and thus it should be understood that the terms "top", "bottom", etc., when used in the following description are used for convenience and to aid understanding of relative positions or directions, and not intended to limit the orientation of the fiber.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1:
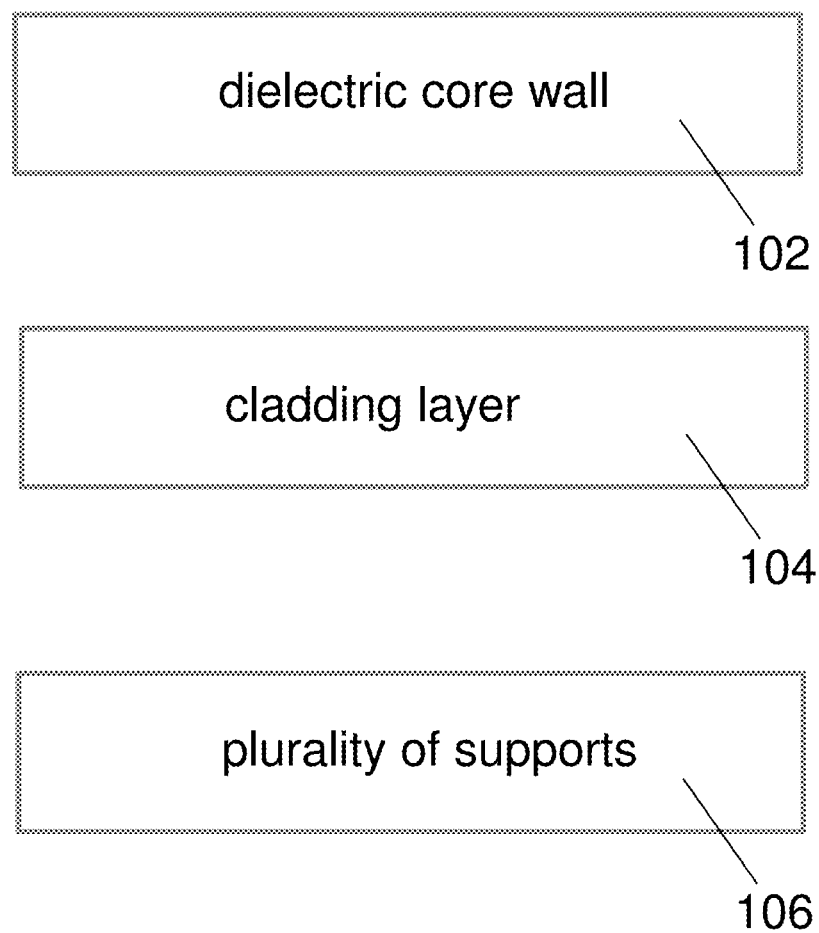
FIG. 1 is a general illustration of an optical fiber for sensing an analyte according to various embodiments.

FIG. 1 is a general illustration of an optical fiber for sensing an analyte according to various embodiments. The optical fiber may include a dielectric core wall 102 (alternatively referred to as core layer or core) defining a hollow space. The optical fiber may also include a cladding layer 104 (alternatively referred to as cladding) surrounding the dielectric core wall 102 and spaced apart from the dielectric core wall 102. The optical fiber may further include a plurality of supports 106 (alternatively referred to as support walls) extending from the cladding layer 104 to the dielectric core wall 102. A thickness of the dielectric core wall 102 may be greater than a thickness of each of the plurality of supports 106. The dielectric core wall 102 may be configured to carry an optical light for sensing the analyte.

In other words, the optical fiber may include an outer cladding layer 104 and an inner dielectric core wall 102 which includes a hollow space. The outer cladding layer 104 may be spaced or separated apart from the dielectric core wall 102 with supports 106 joining the dielectric wall 102 and the cladding layer 104. The optical light traveling along the dielectric core 102 may be used to detect the analyte provided into the optical fiber.

For avoidance of doubt, FIG. 1 serves to provide a general illustration of some of the features of an optical fiber according to various embodiments, and does not serve to limit the shape, size, orientation, arrangement etc. of the features.

The dielectric core wall 102 may extend longitudinally along a length of the optical fiber. Similarly, the cladding layer 104 may extend longitudinally along the length of the optical fiber. The cladding layer 104 may be spaced from the dielectric core wall 102 in a traverse cross-section of the optical fiber. The optical light may travel along the longitudinal length of the optical fiber in the dielectric core wall 102.

The optical light may travel in the dielectric core wall 102 via total internal reflection. The optical light may travel in the dielectric core wall 102 along the longitudinal length of the optical fiber from a first end or end portion of the optical fiber to the second end or end portion of the optical fiber. The light guided by the dielectric core wall 102 may remain confined in the material of the dielectric core wall 102.

The term "analyte" as used herein may refer to any substance or object that can be detected in an assay. Therefore, the analyte may be any substance for which there exists a naturally occurring antibody or for which an antibody can be prepared. The analyte may, for example, be an antigen, a protein, a polypeptide, a nucleic acid, a hapten, a carbohydrate, a lipid, a cell, a virus, or any other of a wide variety of biological or non-biological molecules, complexes or combinations thereof. Generally, the analyte may be a protein, peptide, carbohydrate or lipid derived from a biological source such as bacterial, fungal, viral, plant or animal samples.

The terms "detecting" and "sensing" as used herein may refer to a method of determining the presence and/or quantification of an analyte.

In various embodiments, the dielectric core wall 102 may be of uniform thickness. The dielectric core wall 102 may follow the shape of the hollow space as seen in a traverse section of the optical fiber.

In various embodiments, the hollow space may be circular along the traverse cross-section of the optical fiber. The dielectric core wall 102 may be of a circular annular shape, and may be referred to as a ring core. In various other embodiments, the hollow space may be of any suitable shape, i.e. any suitable regular or irregular shape along the traverse cross-section of the optical fiber.

In various embodiments, the dielectric core wall 102 may include a glass material or a polymer material. The glass material may, for instance, be silica, borosilicate glass, tellurite glass, or chalcogenide glass. The polymer material may, for instance, be polymethyl methacrylate (PMMA), cyclic olefin copolymers, or amorphous fluoropolymers.

In various embodiments, the thickness of the dielectric core wall 102 may be any one value selected from a range from 0.1 μm to 5 μm.

In various embodiments, the thickness of each of the plurality of supports 106 may be any one value selected from a range from 0.05 μm to 5 μm.

In various embodiments, an inner surface of the dielectric core wall 102 may be any one value selected from a range from 3 $\mu m^2$ to $2\times10^5$ $\mu m^2$.

In various embodiments, each of the plurality of supports 106 may be a strut.

In various embodiments, the plurality of supports, the dielectric core wall 102 and the cladding layer 104 may define multiple holes. In various embodiments, a sum of inner surfaces of the multiple holes may be any one value selected from a range from 5 $\mu m^2$ to $8\times10^5$ $\mu m^2$.

Each of the plurality of supports forms a secondary hollow space or open apex with the dielectric core wall 102. The secondary hollow spaces or open apexes may help isolate the optical light to the ring core wall 102.

In various embodiments, the optical fiber may further include a plurality of nanostructures arranged along an inner circumference or perimeter and/or an outer circumference or perimeter (i.e. on the inner surface and/or the outer surface) of the dielectric core wall 102. The nanostructures may be nanospheres or may be any other suitable nanostructures, e.g. nanorods, nanospheres, nanopillars, nanocubes, nanodiscs etc. The nanostructures may include a suitable material such as a metal or a metal alloy, e.g. silver, palladium, gold, platinum, iridium, osmium, rhodium, ruthenium; copper, aluminum, or alloys thereof. In various other embodiments, the nanostructures may include chemical, semiconductor, fluorophore and/or biological material. In various embodiments, the nanostructures may be two dimensional (2D) or three dimensional (3D). In other words, the fiber may be pre-functionalized with chemical, metallic, biological semiconductor, dielectric materials (in two dimensional nanostructures, e.g. nanolayers, or three-dimensional nanostructures). Further, the nanostructures may be single nanostructures or clusters of nanostructures.

The nanostructures may be immobilized onto the inner surface and/or the outer surface via a coupling agent, e.g. a silane coupling agent such as a molecule comprising a di- or trialkoxysilane group and a functional group capable of binding to the metallic nanoparticles, such as an amino or mercapto group. For instance, the coupling agent may be (3-mercaptopropyl)trimethoxysilane (MPTMS) or 3-Aminopropyltriethoxysilane (APTES). The nanostructures may be further functionalized by an analyte-binding molecule immobilized thereon. The analyte-binding molecule may be an antibody, antibody fragment, or antibody-like molecule. The analyte molecules of the analyte may be captured or immobilized by the analyte-binding molecule. In various embodiments, a Raman reporter moiety, e.g. a Raman reporter molecule, may be introduced into the optical fiber to contact and selectively bind to the captured analyte molecules. The term "Raman reporter moiety" as used herein may refer to small organic compounds with distinctive Raman scattering patterns as previously used as Raman spectroscopic reporters which give rise to characteristic surface enhanced Raman spectroscopy (SERS) spectra for detection. The Raman reporter molecule may, for instance, be 2 naphthalenethiol (2-NT) or 4 Aminothiophenol (4-ATP).

In various embodiments, at least one end portion (i.e. the first end portion and/or the second end portion) of the optical fiber may be tapered. In various embodiments, both end portions (i.e. the first end portion and the second end portion) of the optical fiber may be tapered.

In various embodiments, a diameter of a portion of the dielectric core wall at the at least one tapered end portion of the optical fiber may be less than a diameter of a middle portion of the dielectric core wall at a middle section of the optical fiber. The middle portion referred herein may refer to any intervening portion of the optical fiber between the first end portion and the second end portion.

Additionally or alternatively, the dielectric core wall at the at least one tapered end portion of the optical fiber may have a solid core. In other words, the dielectric core wall at the at least one tapered end portion may not include the hollow space. The middle portion of the optical fiber may have the hollow space as defined by the dielectric core wall, and the dielectric core wall may taper at the at least one tapered end portion to form the solid core.

Figure 2:
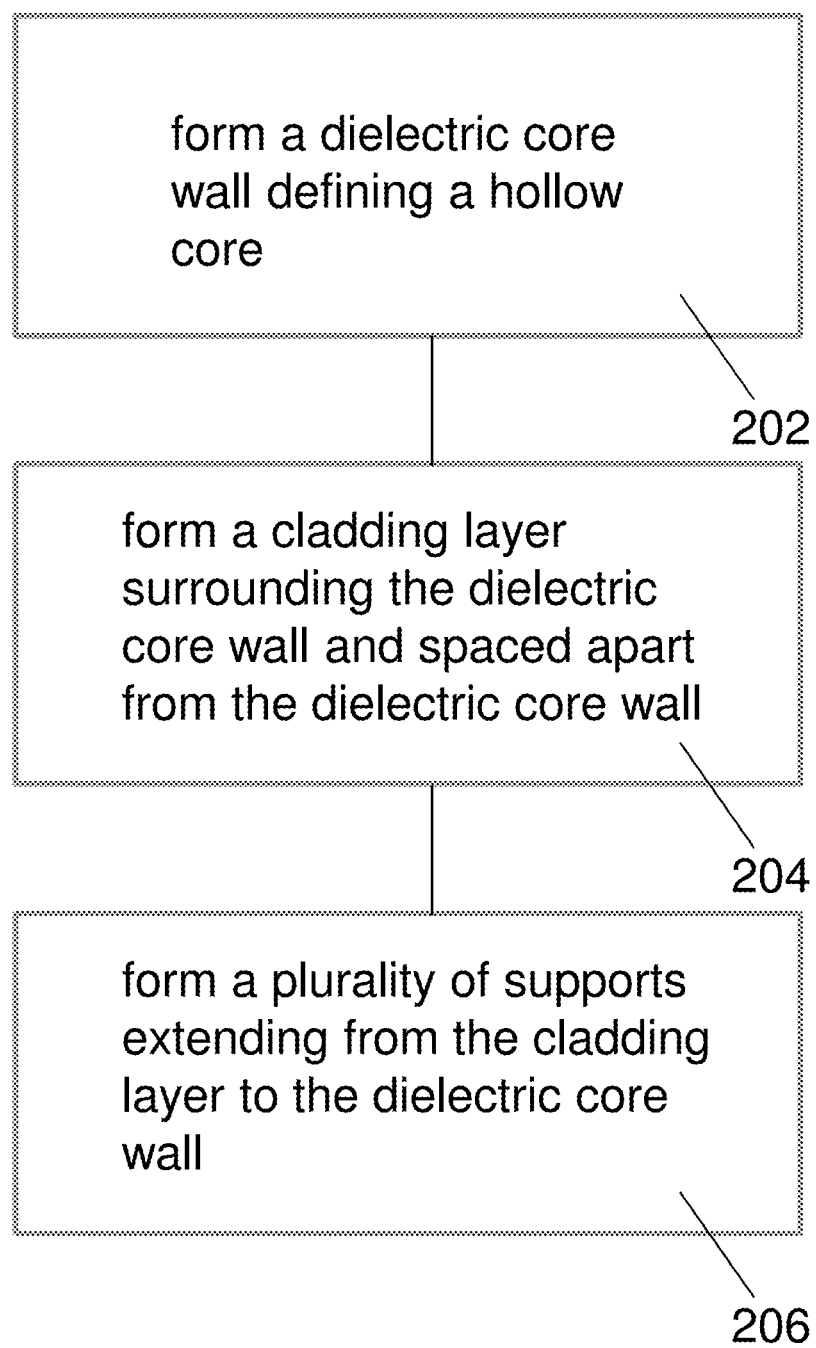
FIG. 2 is a general illustration of a method of forming an optical fiber for sensing an analyte according to various embodiments.

FIG. 2 is a general illustration of a method of forming an optical fiber for sensing an analyte according to various embodiments. The method may include, in 202, forming a dielectric core wall defining a hollow space. The method may also include, in 204, forming a cladding layer surrounding the dielectric core wall and spaced apart from the dielectric core wall. The method may further include, in 206, forming a plurality of supports extending from the cladding layer to the dielectric core wall. A thickness of the dielectric core wall may be greater than a thickness of each of the plurality of supports. The dielectric core wall may be configured to carry an optical light for sensing the analyte.

In other words, the method of fabricating an optical fiber may include forming the dielectric core wall, the cladding layer, and the plurality of supports extending between the dielectric core wall and the cladding layer.

For avoidance of doubt, the steps shown in FIG. 2 may or may not be in sequence. For instance, step 202 may occur before, after or at the same time as step 204.

In various embodiments, the dielectric core wall may include a glass material or a polymer material. The glass material may, for instance, be silica, borosilicate glass, tellurite glass, or chalcogenide glass. The polymer material may, for instance, be polymethyl methacrylate (PMMA), cyclic olefin copolymers, amorphous fluoropolymers.

In various embodiments, the thickness of the dielectric core wall may be any one value selected from a range from 0.1 µm to 5 µm.

In various embodiments, the thickness of each of the plurality of supports may be any one value selected from a range from 0.05 µmm to 5 µm.

In various embodiments, an inner surface of the dielectric core wall may be any one value selected from a range from 3 µm² to 2×10⁵ µm².

In various embodiments, each of the plurality of supports may be a strut.

In various embodiments, the plurality of supports, the dielectric core wall and the cladding layer may define multiple holes (alternatively referred to as channels, e.g. air channels). In various embodiments, a sum of inner surfaces of the multiple holes may be any one value selected from a range from 5 µm² to 8×10⁵ µm².

Each of the plurality of supports forms a secondary hollow space or open apex with the dielectric core wall.

In various embodiments, the optical fiber may further include a plurality of nanostructures arranged along an inner circumference or perimeter and/or an outer circumference or perimeter of the dielectric core wall.

In various embodiments, at least one end portion (i.e. the first end portion and/or the second end portion) of the optical fiber may be tapered. In various embodiments, both end portions (i.e. the first end portion and the second end portion) of the optical fiber may be tapered.

In various embodiments, a diameter of a portion of the dielectric core wall at the at least one tapered end portion of the optical fiber may be less than a diameter of a middle portion of the dielectric core wall at a middle section of the optical fiber.

Additionally or alternatively, the dielectric core wall at the at least one tapered end portion of the optical fiber may have a solid core.

The optical fibers may be fabricated using different processes such as i) the stack-and-draw, ii) drilled and draw, or iii) extrusion process. The stack-and-draw process may include drawing a tube (e.g. a glass tube) down to capillaries that are stacked together to form the dielectric core wall defining the hollow space. The stack may be then inserted into a tube (e.g. glass tube). This structure may then be drawn down to form a rigid cane including the hollow space and the holes. The cane may then be inserted in another tube that is finally drawn down to an optical fiber. The fabrication step of a cane may not be required depending on the fiber design, meaning that the stack could be directly drawn to fiber.

The drilled and draw process may include drilling a rod to from the targeted pattern of hollow space and holes according to the fiber design. The drilled rod is then drawn to form the optical fiber. An intermediate step could be added; the drilled rod may be drawn down to cane that is then inserted into a tube and drawn down to fiber.

The extrusion process may include pushing melted material, e.g. glass, into a dye and drawing the structured melted glass down to fiber. The dye may be designed in a way to obtain the targeted fiber design after the melted glass goes through it. An intermediate step may also be added by fabricating a cane that is then inserted into a glass tube and drawn down to fiber.

Tapering one or both ends of the fiber may be carried out using a fiber post-processing process that includes heating and stretching. Examples of devices that could be used for heating the fiber may include flame burner, small oven, laser (e.g. carbon dioxide ($CO_2$) laser). Stretching the fiber may be realized by using standard translations stages (preferably motorized).

Figure 3:
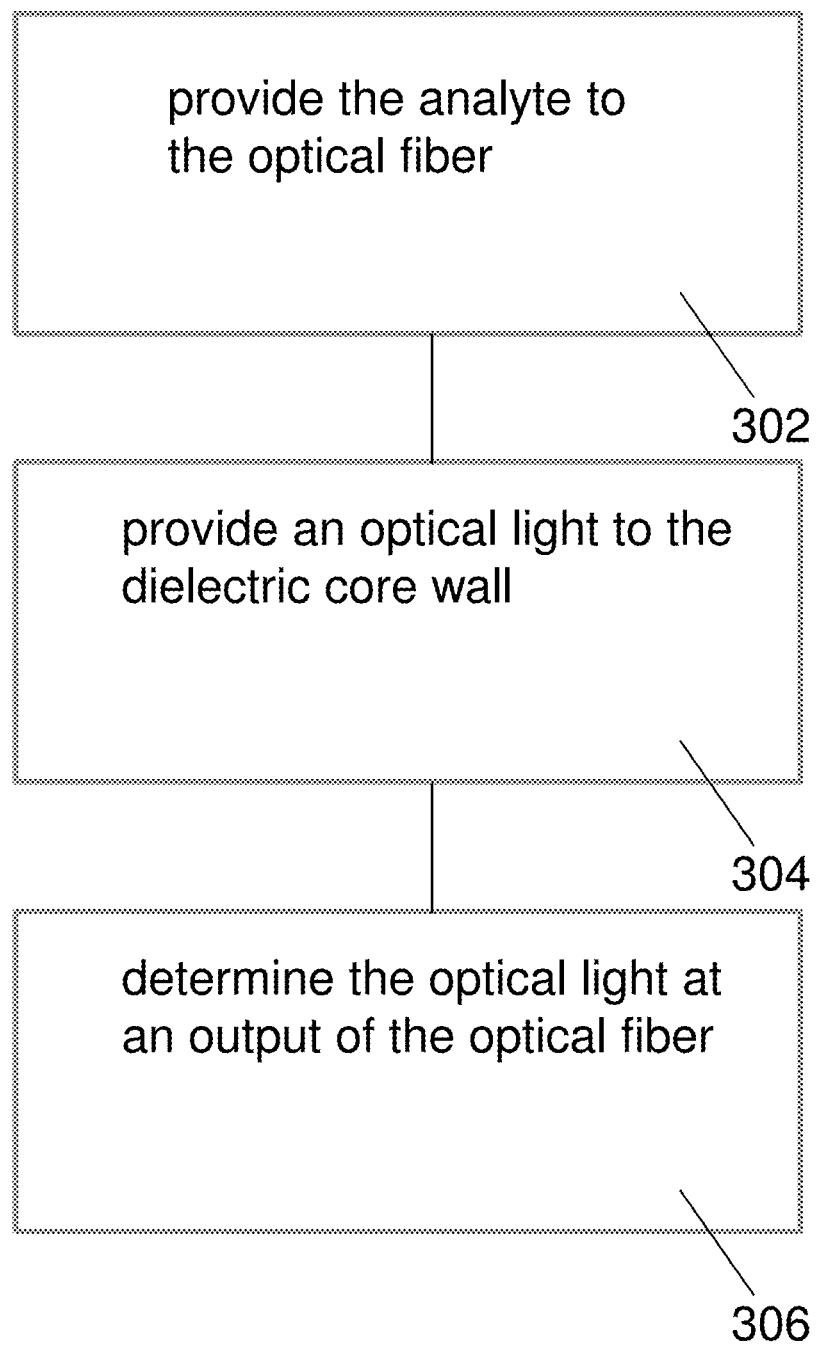
FIG. 3 is a general illustration of a method of using an optical fiber for sensing an analyte according to various embodiments.

FIG. 3 is a general illustration of a method of using an optical fiber for sensing an analyte according to various embodiments. The method may include, in 302, providing the analyte to the optical fiber. The optical fiber may include a dielectric core wall defining a hollow space, a cladding layer surrounding the dielectric core wall and spaced apart from the dielectric core wall, and a plurality of supports extending from the cladding layer to the dielectric core wall. The method may also include, in 304, providing an optical light to the dielectric core wall which carries the optical light for sensing the analyte. The method may also include, in 306, determining (e.g. analyzing and/or measuring) the optical light at an output of the optical fiber. A thickness of the dielectric core wall may be greater than a thickness of each of the plurality of supports.

In other words, sensing an analyte may include providing the analyte to the optical fiber, providing an optical light to the dielectric core wall to detect the analyte, and analyzing and/or measuring the optical light at least one output of the fiber.

Various embodiments may require the analyte to be in the optical fiber when the optical light is provided to the dielectric core. In various embodiments, the optical light may be provided prior to providing the analyte, but may also be provided during and after providing the analyte.

In various embodiments, the method may include arranging a plurality of nanostructures, e.g. nanospheres, along an inner circumference and/or an outer circumference of the dielectric core wall.

In various embodiments, the analyte may be sensed via absorption spectroscopy, fluorescence-based detection, surface Plasmon resonance method, or Raman spectroscopy.

Figure 4A:
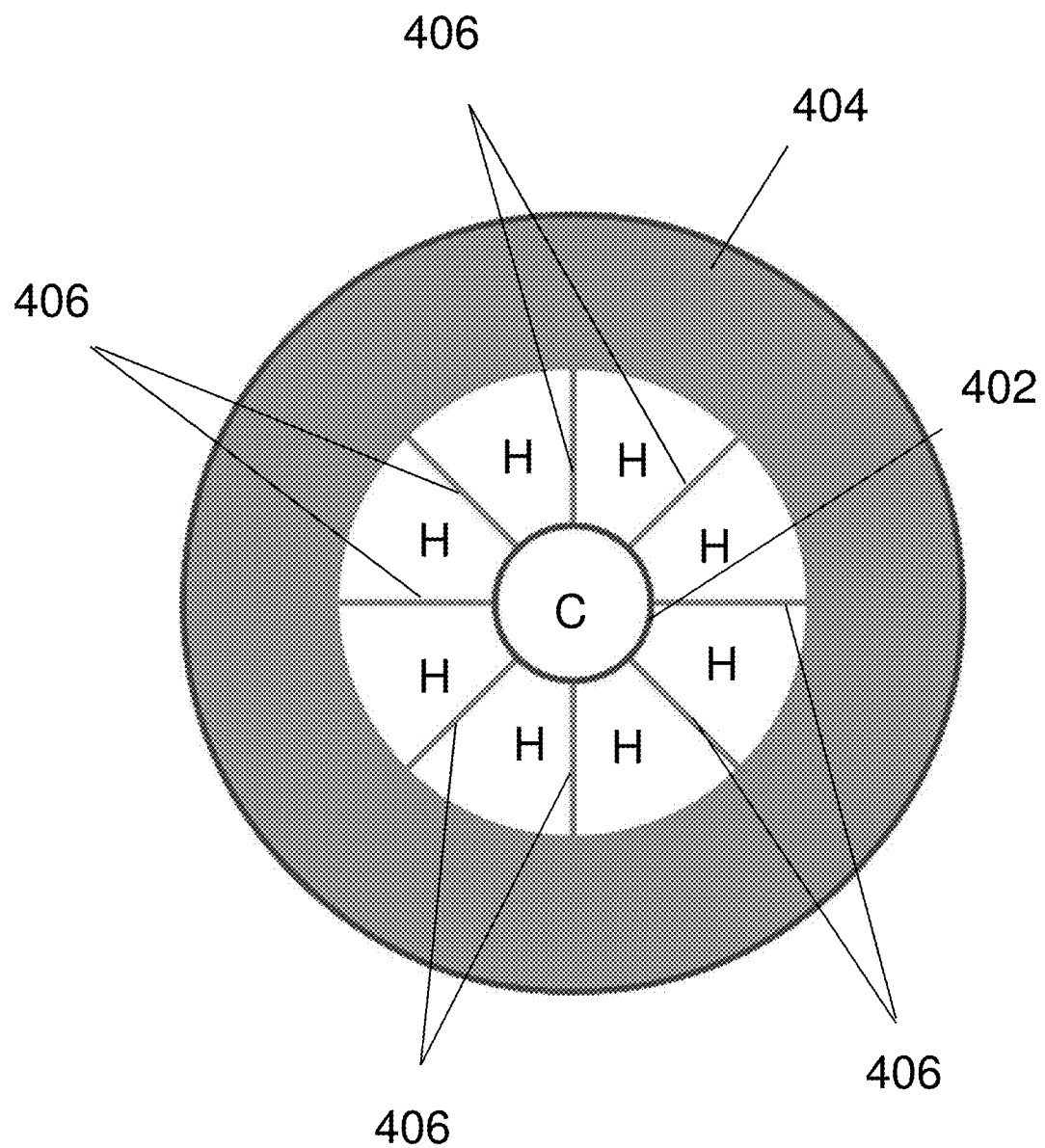
FIG. 4A is a schematic showing a traverse section of an optical fiber for sensing an analyte according to various embodiments.
Figure 4B:
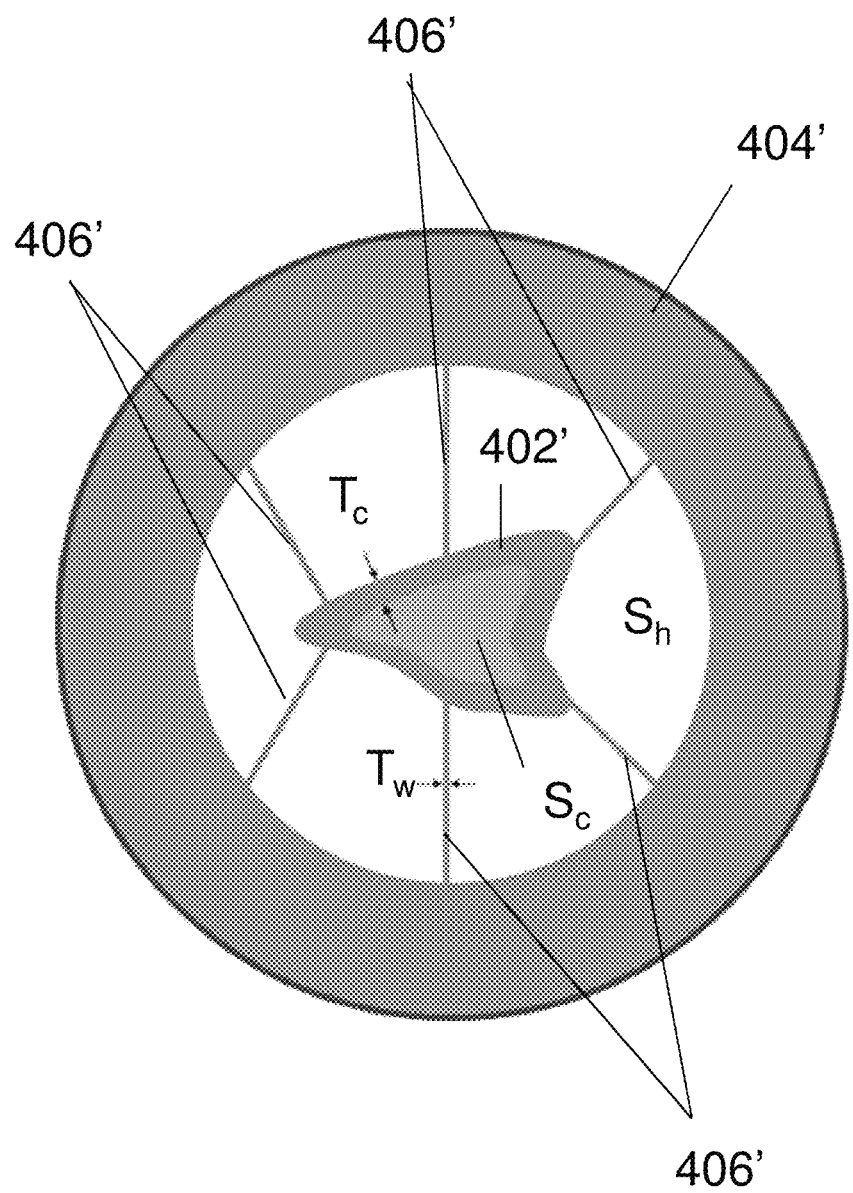
FIG. 4B is a schematic showing a traverse section of an optical fiber for sensing an analyte according to various other embodiments.

FIG. 4A is a schematic showing a traverse section of an optical fiber for sensing an analyte according to various embodiments. FIG. 4B is a schematic showing a traverse section of an optical fiber for sensing an analyte according to various other embodiments. As shown in FIGS. 4A-B, the optical fiber may include a dielectric core wall 402, 402' (alternatively referred to as core layer) defining a hollow space (denoted as C in FIG. 4A). The optical fiber may further include a cladding layer 404, 404' (alternatively referred to as cladding) surrounding the dielectric core wall 402, 402' and spaced apart from the dielectric core wall 404, 404'. The optical fiber may also include a plurality of supports 406, 406' extending from the cladding layer 404, 404' to the dielectric core wall 402, 402'. FIGS. 4A-B show only traverse sections of optical fibers which may extend along their longitudinal lengths similar to pipes.

The dielectric core wall 402 may have an annular or circular ring shape as shown in FIG. 4A (and may be referred to as a ring core), or may be of another shape, such as an irregular shape as shown in FIG. 4B, with a hollow space. The shape of the hollow space as seen in the traverse cross-sections may follow the shape of the dielectric core wall 402, 402'. The shape of the hollow space may be circular as shown in FIG. 4A, or may be irregular as shown in FIG. 4B. The cladding layer 404, 404' may be of a circular annular or circular ring shape. The plurality of supports 406, 406' may be struts, and may extend between the dielectric core wall 402, 402' and the cladding layer 404, 404'. The optical fiber shown in FIG. 4A has 8 struts, while the optical fiber shown in FIG. 4B has 6 struts. However, in various embodiments, the optical fiber may have any suitable number of supports or struts. The struts may be made of or may include silica ($SiO_2$). However, the supports or struts may be made of or include another glass material such as borosilicate glass, tellurite glass, or chalcogenide glass, or a polymer such as polymethyl methacrylate (PMMA). The struts may extend along the longitudinal length of the optical fiber so that the channels H are isolated from one another along the longitudinal length of the fiber. Similar structures similar to that shown in FIG. 4A or FIG. 4B may be obtained at anywhere along the portion of the fiber between the two end portions. The struts may be as thin as possible to approach the ideal case of an isolated suspended core.

As shown in FIGS. 4A-B, the struts may divide the space between the dielectric core wall 402, 402' into holes (alternatively referred to as channels or air channels, denoted as H in FIG. 4A). As shown in FIG. 4A, the holes may form an arrangement which is concentric to the hollow space. The analyte, which may be a liquid, a gas or a vapor, or a volatile component, may be provided in the hollow space and in the channels. The dielectric core wall 402, 402' may carry an optical light. Accordingly, the dielectric core wall 402, 402' may have two boundaries, i.e. a large perimeter as shown in the traverse sections, to increase or maximize the surface for interactions between the analyte and the optical light.

The shape of the core may increase the interactions surface (defined by the product of the perimeter and the length of the optical fiber) with a large fraction of evanescent field in the channels surrounding the dielectric core wall 402, 402'. For a constant core diameter, the thickness of the dielectric core wall 402, 402' may make it possible to control and increase the evanescent field fraction, in contrast to a solid core wherein this fraction depends only on the core diameter. It is noteworthy that examples of dielectric core walls 402, 402' as shown in FIGS. 4A-B may be extended to any core shape as long as the core includes two boundaries (in the cross section). The number of holes or channels may vary depending on the core shape.

The different parameters of the various features may vary. In various embodiments, the thickness of the supports 406, 406' (indicated as $T_w$ in FIG. 4B) may be any value selected from 0.05 µm to 5 µm. In various embodiments, the thickness of the dielectric core walls 402, 402' (indicated as $T_c$ in FIG. 4B) may be any value selected from 0.1 µm to 5 µm. In various embodiments, an inner surface of the dielectric core wall 402, 402' (i.e. the inner surface which defines the hollow space C) may be any one value selected from a range from 3 µm² to $2 \times 10^5$ µm². In various embodiments, the sum of the inner surfaces of the remaining holes (H) (not including the surface of the dielectric core wall 402, 402') may be any one value selected from a range from 5 µm² to $8 \times 10^5$ µm².

The design is demonstrated through simulation studies of an idealistic case of a ring core suspended in the analyte. The results are compared with the case of a silica rod in the analyte that corresponds to the idealistic case of the small core photonic crystal fibers, which are so far the most and best fiber for sensing an analyte with the evanescent field. The cases are idealistic because the parasitic interactions with confined light in the supports or struts (that hold the core, i.e. the ring or rod, in both cases) are not considered. Nevertheless, these interactions may be strongly attenuated by properly designing and fabricating the fibers. Therefore, these simulations may be relatively accurate for demonstrating the interest of this concept for sensing analytes.

The performances of both fiber designs may be evaluated for surface enhanced Raman spectroscopy (SERS) based sensing with a numerical model developed by Chen et al. ("Advantage of multi-mode sapphire optical fiber for evanescent-field SERS sensing," Opt. Lett., vol. 39, no. 20, p. 5822, October 2014) that gives an estimation of the Raman intensity. The gold nanospheres (required for SERS effect) may be considered as an effective layer with an effective complex permittivity that depends on the microsphere diameter, the coverage density of microspheres and the refractive index of the analyte.

Figure 5:
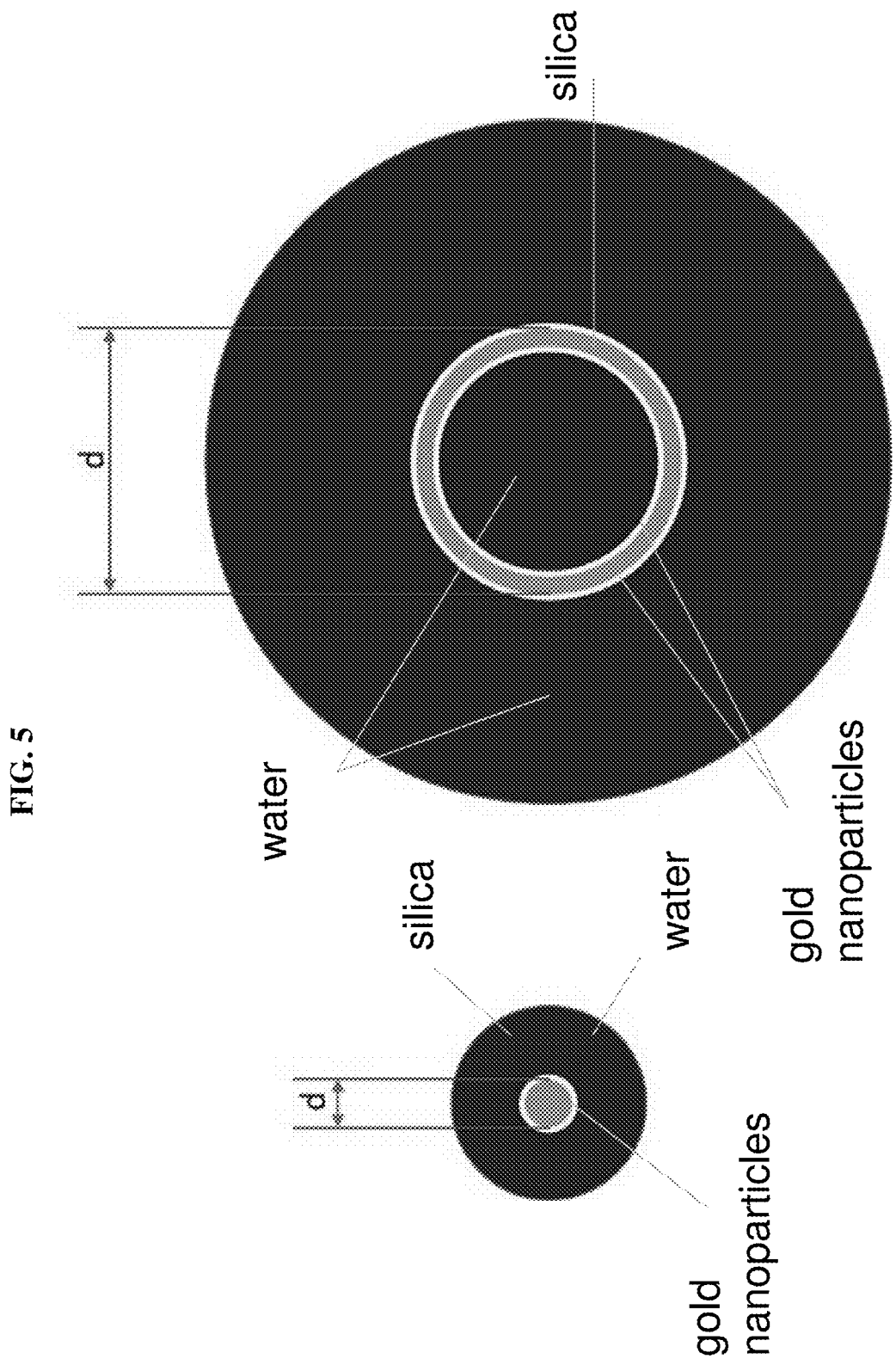
FIG. 5 is a schematic illustrating (left) the idealistic case of a glass rod in liquid, and (right) the idealistic case of a ring-core fiber in liquid which is used to represent the optical fiber according to various embodiments.

FIG. 5 is a schematic illustrating (left) the idealistic case of a glass rod in liquid, and (right) the idealistic case of a ring-core fiber in liquid which is used to represent the optical fiber according to various embodiments.

Simulation Study of the Idealistic Small Core Fiber, i.e. a Silica Rod in the Analyte In the simulation, a silica rod with a diameter of d=1 µm is surrounded by a layer of water (n=1.33, thickness of 10 µm). The gold nanospheres with a diameter of about 60 nm and a coverage density of $0.05 \times 10^{12}$ nanospheres/µm² may be considered as an effective layer around the silica rod with a thickness of 60 nm and a complex permittivity that is calculated following a relation described in Chen et al.

Figure 6:
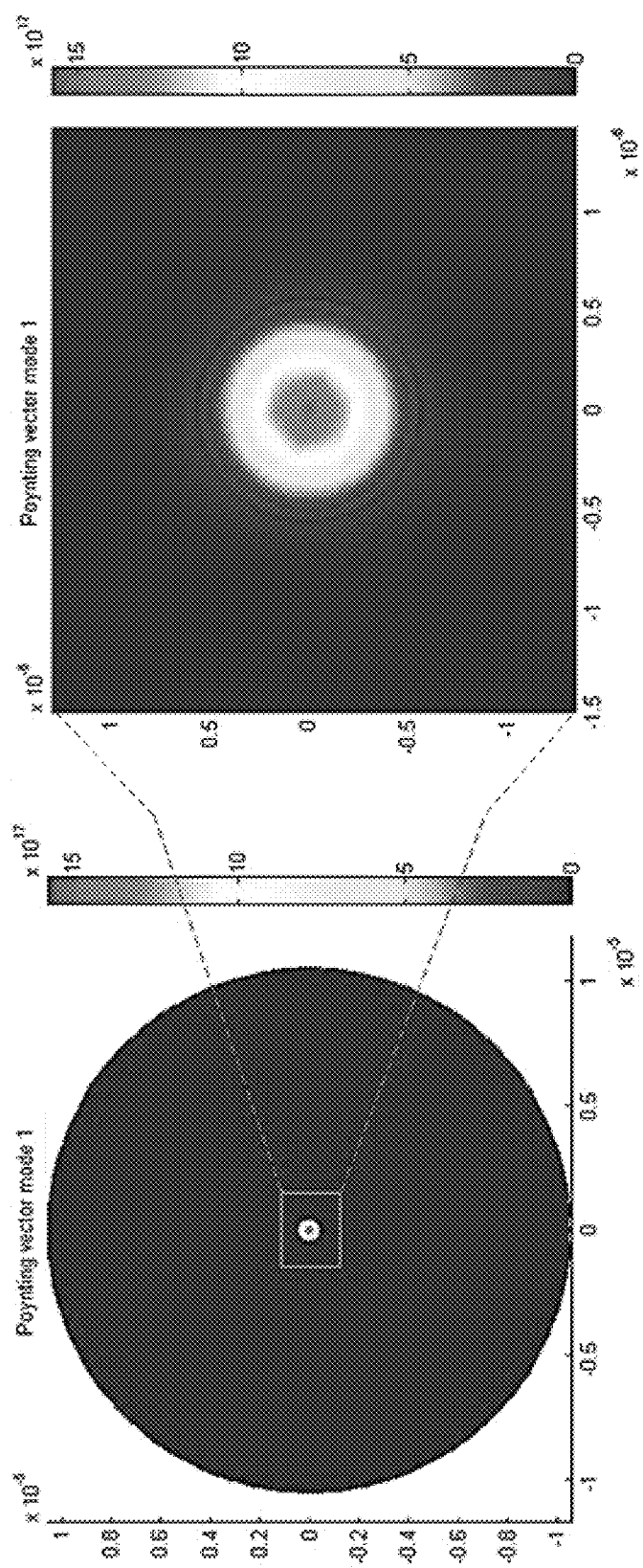
FIG. 6 shows (left) a two-dimensional (2D) simulated distribution of intensity of the simulated fundamental mode (LP01) in a solid silica core fiber in wafer, and (right) a magnified image of the simulated intensity distribution around the silica rod.

The 2D distribution of the light intensity guided in this fiber is shown in FIG. 6 with a zoom-in around the silica rod. FIG. 6 shows (left) a two-dimensional (2D) simulated distribution of intensity of the simulated fundamental mode ($HE_{11}$) in a solid silica core fiber in wafer, and (right) a magnified image of the simulated intensity distribution around the silica rod. The wavelength is 633 nm. Most of the light (89%) is confined in the silica rod, 4.5% of the light is in the effective layer of the gold nanospheres, and 6.5% is in water. The calculated Raman intensity (from Chen et al.) is 4.9 a.u. for this configuration.

Simulation of the Optical Fiber According to Various Embodiments as an Idealistic Case of a Silica Ring in an Analyte The idealistic case approximates the optical fiber as a silica ring with a diameter of 25 μm and a thickness of 500 nm immersed in water. The nanospheres are simulated by adding an effective layer on both sides (inner and outer) of the ring. The parameters of these layers are the same of the one used for the silica rod (nanospheres diameter of 60 nm and coverage density of $0.05 \times 10^{12}$ nanospheres/μm²).

Figure 7:
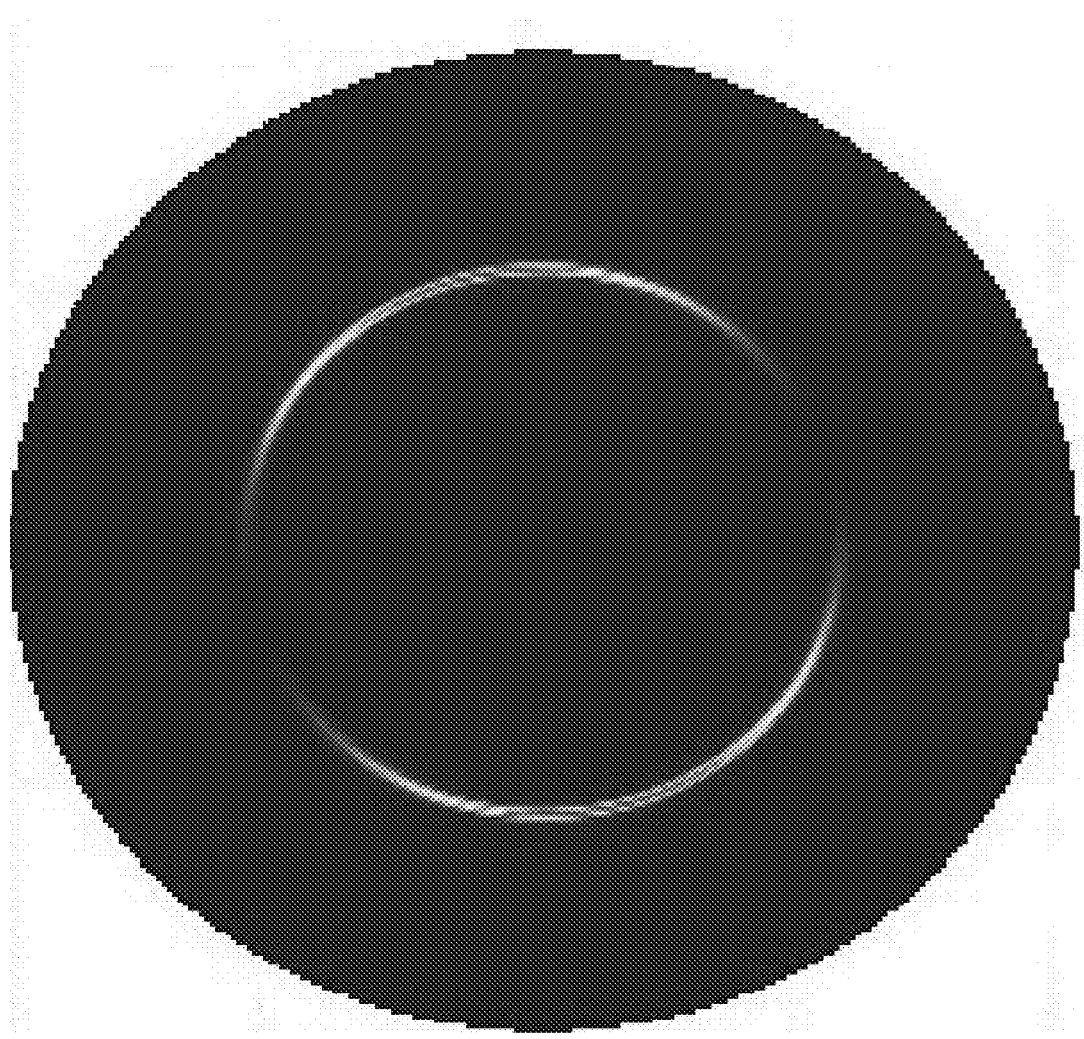
FIG. 7 shows a two-dimensional (2D) simulated distribution of intensity of one of the modes guided in the ring core fiber which represent the ideal case of the optical fiber according to various embodiments.
Figure 8:
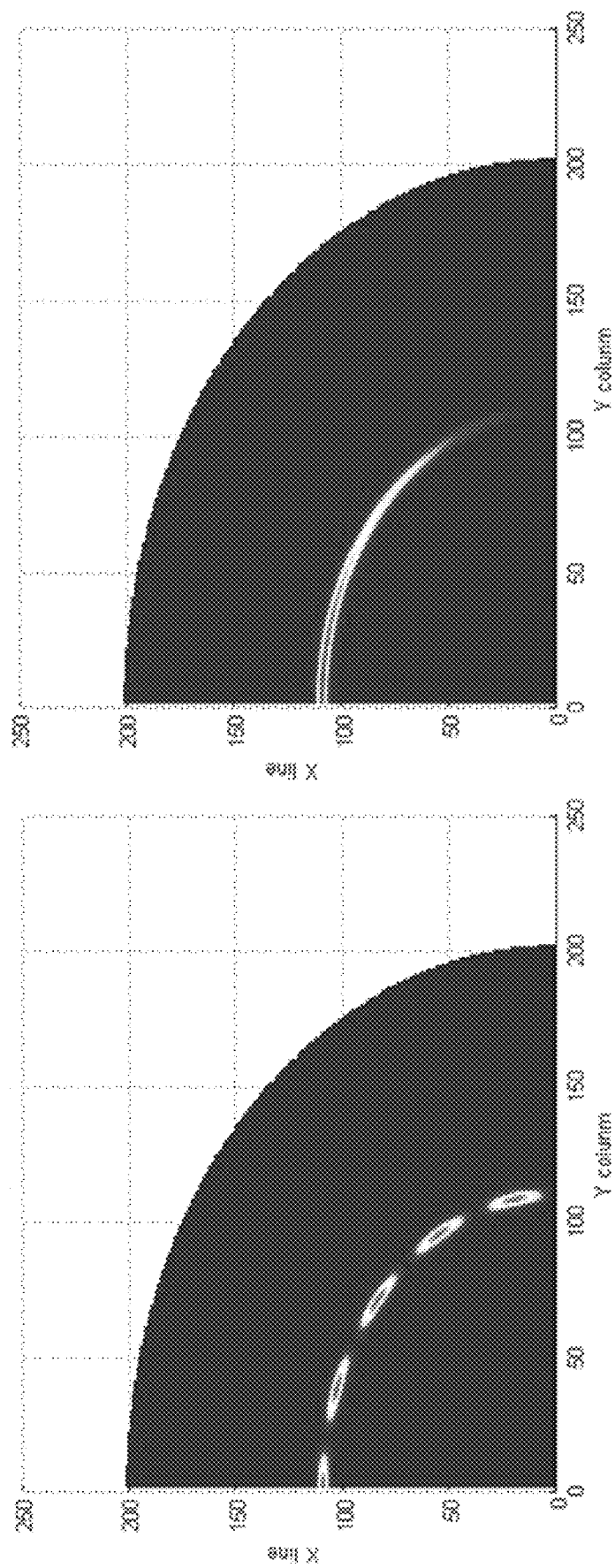
FIG. 8 shows (left) a two-dimensional (2D) simulated distribution of intensity of a first mode, and (right) a two-dimensional (2D) simulated distribution of intensity of a second mode in the ring core fiber which represent the ideal case of the optical fiber according to various embodiments.

In contrast with the silica rod, numerous modes can be propagated in this fiber, not only the fundamental one. An example of the 2D distribution of the intensity of a mode is shown in FIG. 7. FIG. 7 shows a two-dimensional (2D) simulated distribution of intensity of one of the modes guided in the ring core fiber which represent the ideal case of the optical fiber according to various embodiments. FIG. 8 shows (left) a two-dimensional (2D) simulated distribution of intensity of a first mode, and (right) a two-dimensional (2D) simulated distribution of intensity of a second mode in the ring core fiber which represent the ideal case of the optical fiber according to various embodiments. The simulation window in FIG. 8 is reduced to a quarter.

The distribution of the light intensity propagated by one mode (fundamental or higher order modes) inside the entire ring is not uniform. Instead, the distribution contains several maximums and minimums (see FIGS. 7-8). Nevertheless, these different light distributions of each mode in the ring core do not have a strong impact on the fraction of light in the two effective layers of gold nanospheres. The fraction of the light intensity in these effective layers of gold nanospheres is around 4% for all the simulated modes. Most of the light (around 82%) is confined in the ring core and the last 10% is distributed in the two water layers (i.e. one inside the ring and another outside the ring).

As the fraction light intensity is almost the same for all the modes, we consider in the following only the first mode (i.e. the one with the highest effective index). By applying the previous model to this fiber design, we have been able to calculate the approximated Raman intensity of about 85 a.u.

Figure 9:
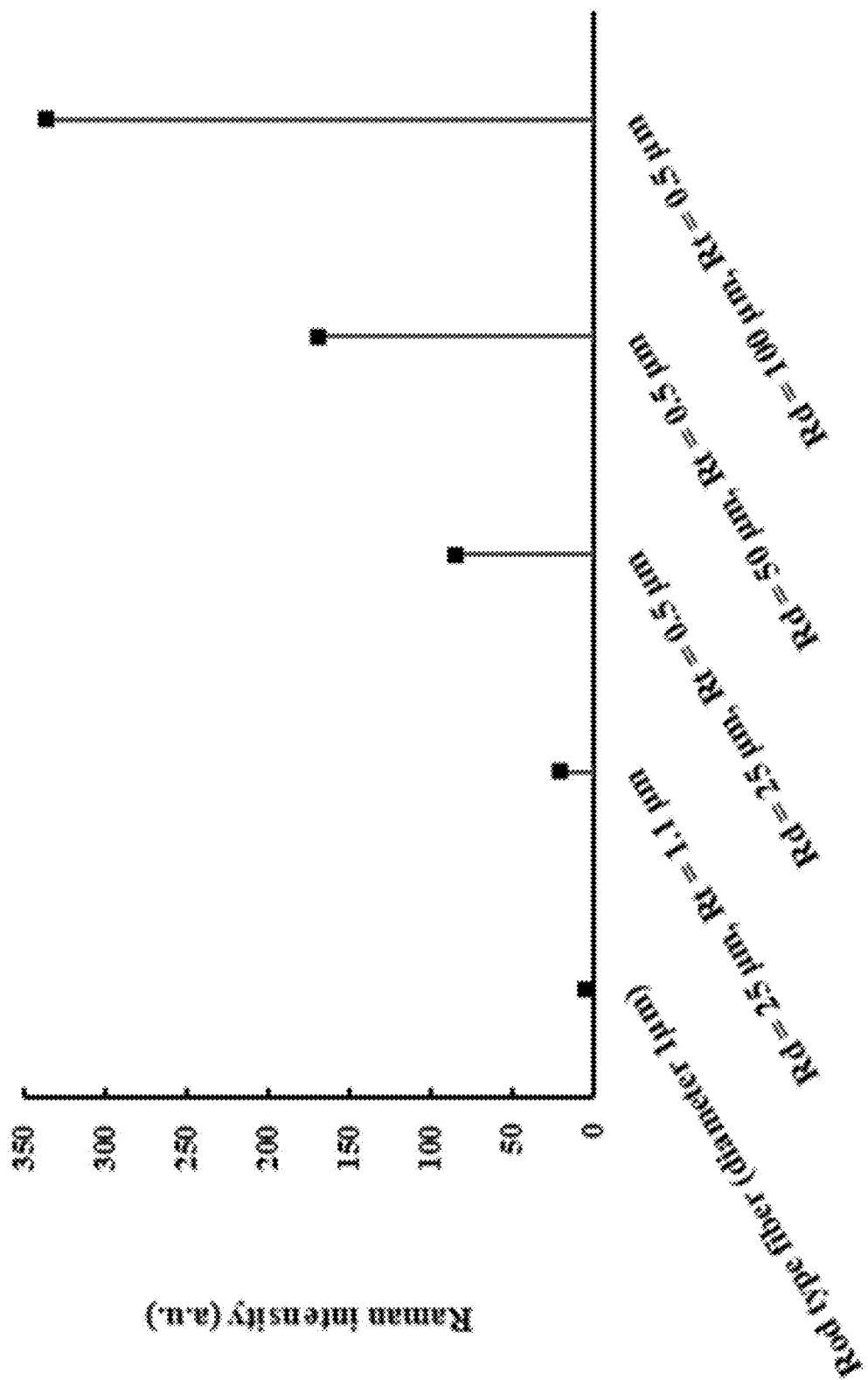
FIG. 9 is a plot of Raman intensity (in arbitrary units or a.u.) comparing a rod type fiber and various ring core fibers of different diameters and ring thicknesses according to various embodiments.

The fraction of light in the silica is comparable in both cases (89% and 82%), meaning that the effect of the light absorption by the analyte is similar and may not affect the comparison. Therefore, these simulations demonstrate that the fiber design may improve by more than one order of magnitude (17 times) the sensing performances of an analyte with the SERS method. This improvement may be driven by the augmentation of the interaction surface due to the design. Therefore, larger core diameters (with a constant thickness) lead to better sensing performances (ex. Raman Intensity). FIG. 9 is a plot of Raman intensity (in arbitrary units or a.u.) comparing a rod type fiber and various ring core fibers of different diameters and ring thicknesses according to various embodiments. "Rd" refers to the diameter of the ring and "Rt" refers to the thickness of the ring. As shown in the FIG. 9, the simulated Raman intensity increases when core diameter increases. A Raman intensity of about 325 a.u. is obtained by only increasing the core diameter up to 100 μm. This corresponds to an improvement factor of more than two orders to the small core fiber (silica rod) that is so far the best fiber for sensing an analyte.

It may be worthy to note that the fraction of evanescent field overlapping in the gold nanoparticle layers is similar in the simulations of the 25 μm, 50 μm and 100 μm ring diameters. For instance, this portion represents 7.52% in all three cases, while the light guided in the silica ring is 82.3% in each of these three cases. This may be explained by the fact that this evanescent field may be mostly due to the ring thickness, which is constant between these three cases. This means that the same propagation conditions are similar in all three cases (i.e. the analyte can absorb the same amount of light in every case), and so this may lead to a fair comparison.

It may also be worthy to note that the SERS method requires more stringent conditions (including good balance between fraction of light in interaction with the nanospheres and good light-absorption by the nanospheres which leads to a good Raman signal) than other sensing methods such as fluorescence, which may only be dependent on improving the fraction of evanescent light and the surface of interactions.

Simulation is also carried out for fluorescence-based sensing based on the small diameter silica core and the thin-wall ring-silica fiber shown in FIG. 5.

Simulation Study of the Idealistic Small Core Fiber, i.e. a Silica Rod in the Analyte A silica-rod with a diameter of 1 μm surrounded by propanol only is simulated. Two wavelengths are considered for the simulations: 532 nm, which is the excitation wavelength, and 590 nm, which is the fluorescence wavelength. For these two wavelengths, propanol has slightly different indexes: refractive index of propanol for 532 nm ($n_{532}$) is $1.38-8.1457 \times 10^{-8}$ and refractive index of propanol for 590 nm ($n_{590}$) is $1.3776-6.5883 \times 10^{-8}$. For evaluating the fluorescence-based sensing performances of the fiber, the fraction of evanescent power at the vicinity of the fiber surface where the interaction between the light and the fluorophore occurs may be calculated. This interaction area is considered in the model as an external layer of propanol with a thickness of 100 nm.

In this configuration, most of the light (fundamental mode) is guided inside the core (approximatively 88% at 532 nm and 85% at 590 nm). The fraction of the evanescent light in the interaction layer is 7% at 532 nm and 8% at 590 nm. By adjusting the formula in Chen et al., a factor of merit of the fluorescence intensity of $1.78 \times 10^{-9}$ a.u. may be determined using this fiber geometry.

Simulation of the Optical Fiber According to Various Embodiments as an Idealistic Case of a Silica Ring in an Analyte As for the simulation of the silica-rod in propanol, a virtual layer of propanol with a thickness of 100 nm may be considered in the vicinity of the inner and outer surface of the silica-ring for evaluating the fraction of evanescent field interacting with analyte and fluorophore (anchored or adsorbed on the surfaces). Silica-ring fibers with different diameters but with a constant thickness of 500 nm of the silica wall are simulated. The simulations parameters (operating wavelengths, refractive index) are the same as the ones used for the rod fiber.

Figure 10:
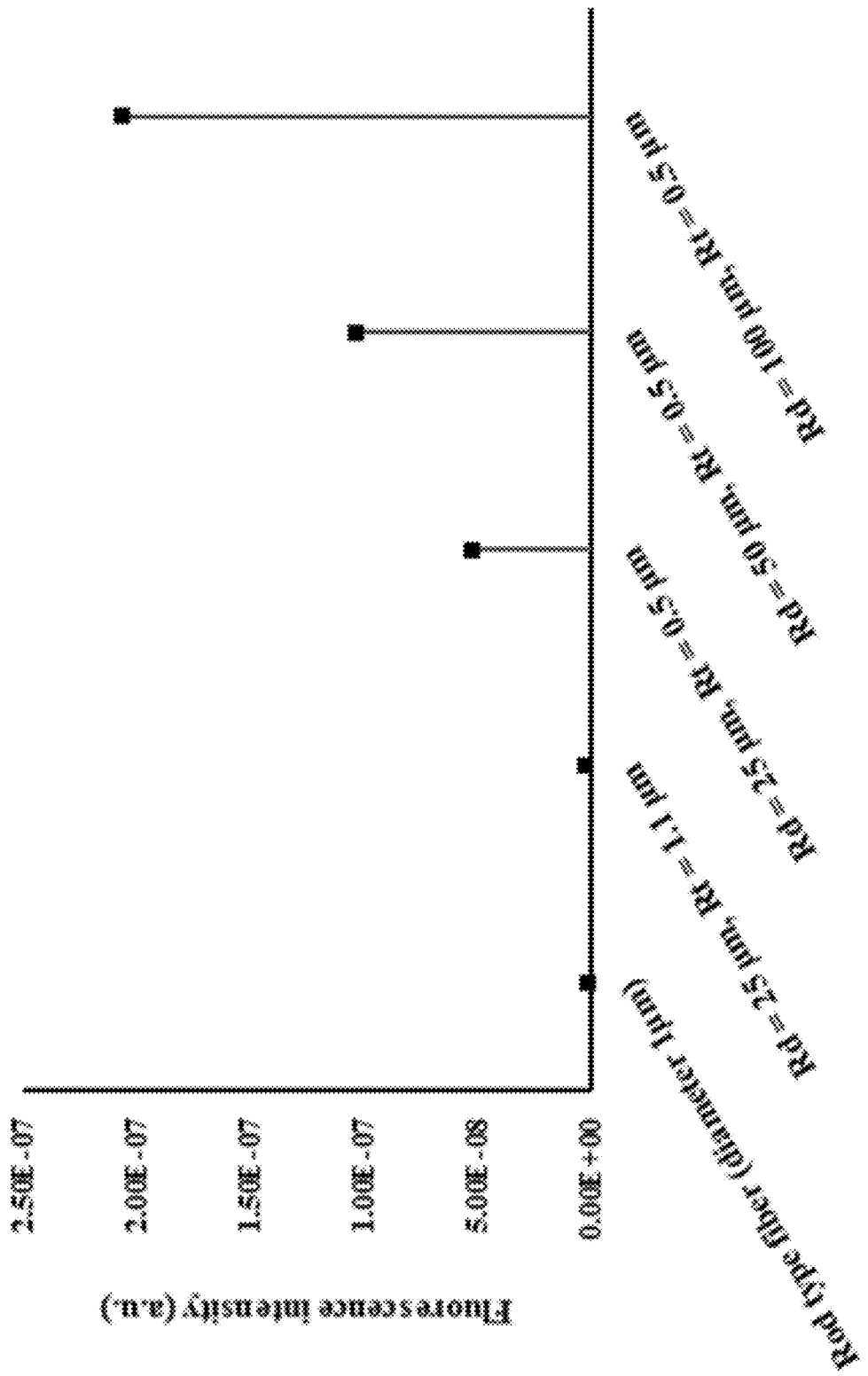
FIG. 10 is a plot of fluorescence intensity (in arbitrary units or a.u.) comparing a rod type fiber and various ring core fibers of different diameters and ring thicknesses according to various embodiments.

The modes guided by the ring-core fiber in propanol have are similar to the ones simulated in the ring-core fiber with gold nanoparticles anchored on the core surfaces. Since the fraction of evanescent field is similar between the different modes, the mode with the highest effective index is considered. In this configuration, most of the light is confined inside the ring: 80% at 532 nm and 77% at 590 nm. The evanescent fields are around 6% in the inner and outer first 100 nm of propanol. FIG. 10 is a plot of fluorescence intensity (in arbitrary units or a.u.) comparing a rod type fiber and various ring core fibers of different diameters and ring thicknesses according to various embodiments. "Rd" refers to the diameter of the ring and "Rt" refers to the thickness of the ring. For a diameter of 100 µm, the fluorescence intensity is $2 \times 10^{-7}$ a.u. which is 115 times higher than the one calculated for a silica rod.

It may be worthy to note that a larger ring-core diameter may lead to a larger surface of interactions without changing the propagation conditions of the ring-core fiber. The fraction of evanescent light at the vicinity of the core surfaces may depend mostly on the thickness of the ring and may be almost independent of the ring-core diameter. This property may be crucial since it enables the surface of interactions to increase by increasing the ring-core diameter, thus leading to improved sensing performances of the fiber, without limiting the guiding performance. Various embodiments may significantly improve the performances of optical fiber sensors based on evanescent light interactions with an analyte in SERS or fluorescence based methods.

Figure 11:
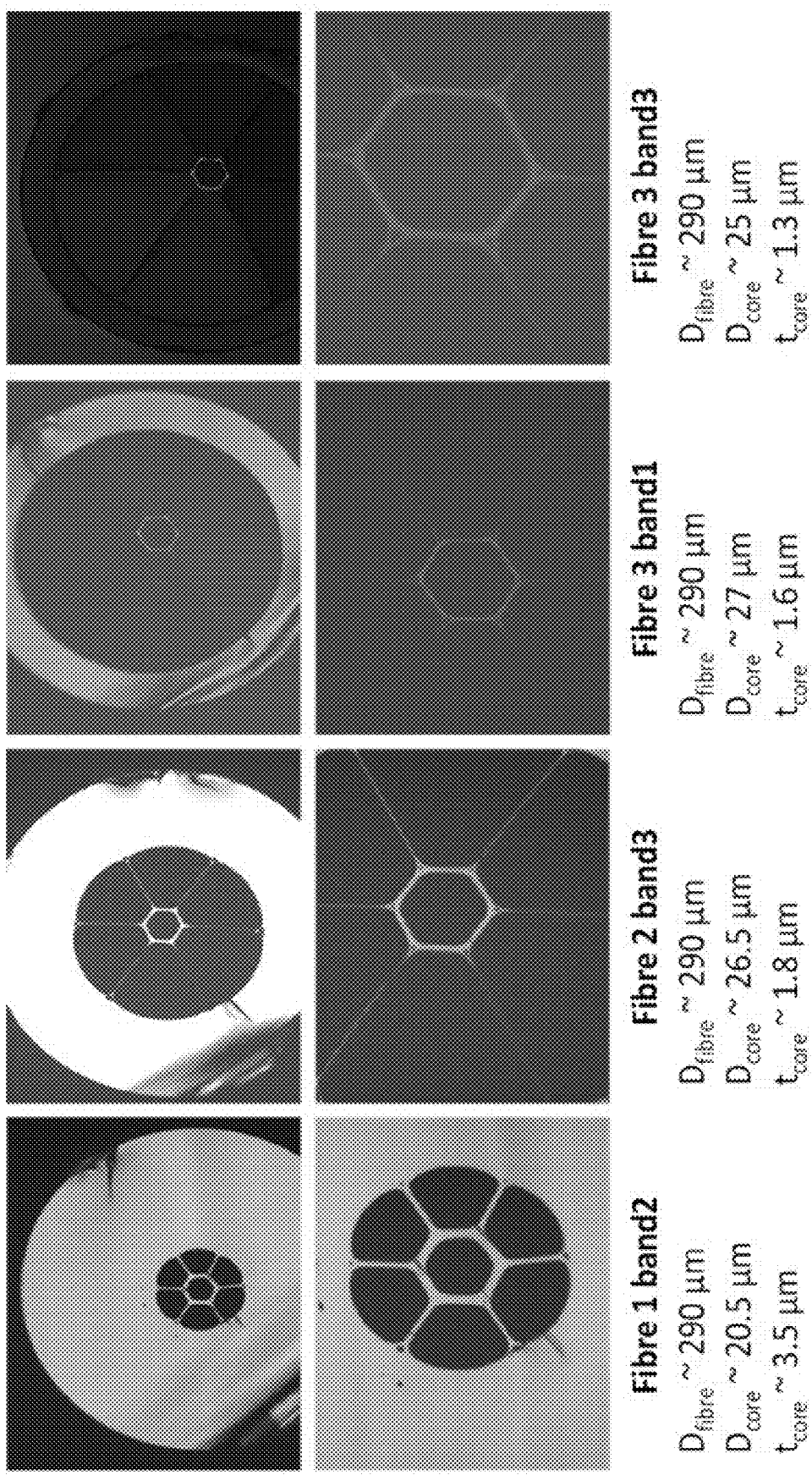
FIG. 11 shows microscope photographs of cross-sections of fabricated optical fibers according to various embodiments.

Different samples of optical fibers have also been fabricated. FIG. 11 shows microscope photographs of cross-sections of fabricated optical fibers according to various embodiments. $D_{fibre}$ refers to the diameter of the fiber, $D_{core}$ refers to the diameter of the hollow space defined by the annular ring core, and $t_{core}$ refers to the thickness of the annular ring core.

Figure 12:
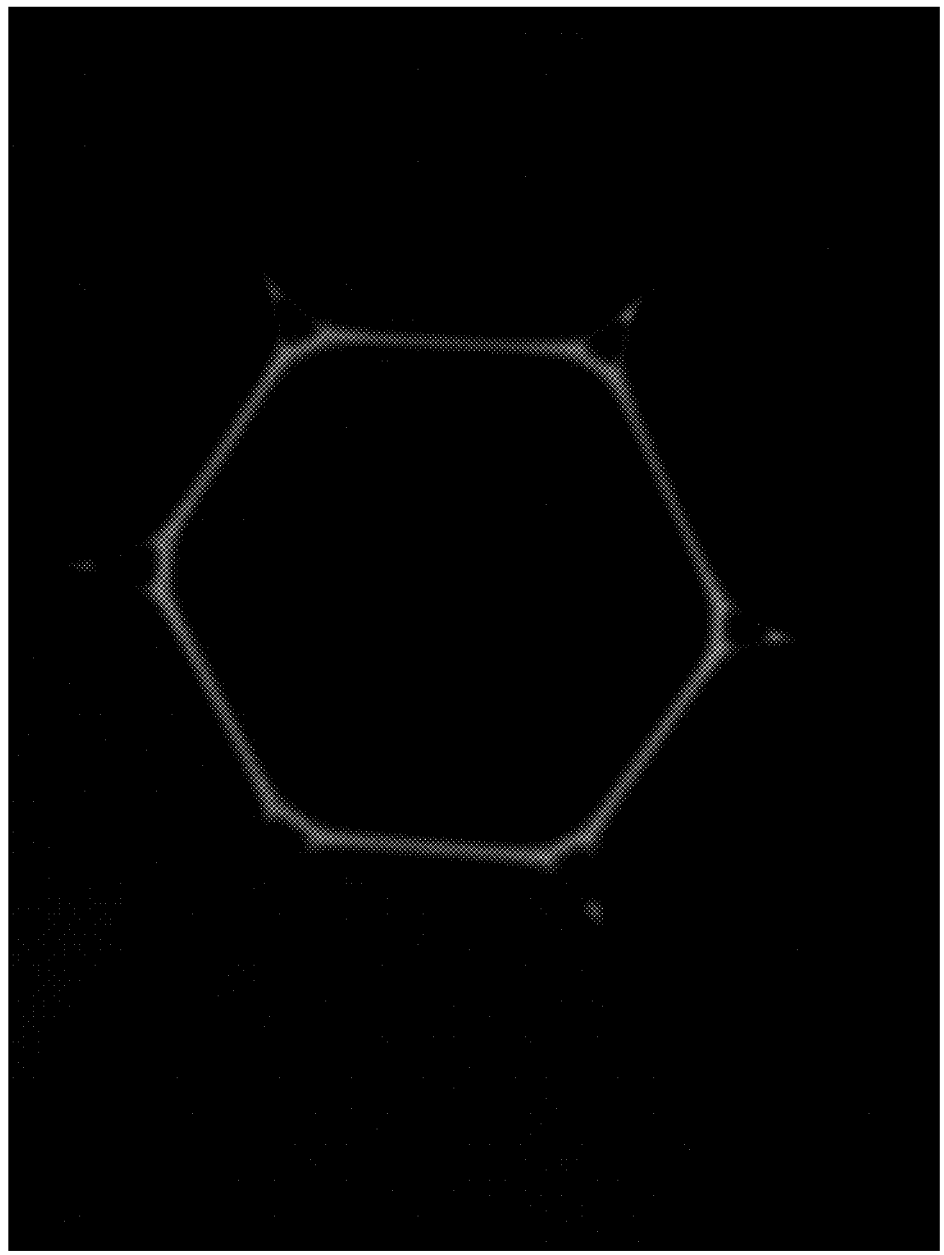
FIG. 12 is a photograph showing the near field intensity distribution of light at an end of an optical fiber with a ring core according to various embodiments. The photograph is taken by a charged coupled device (CCD) camera.

Each of the fabricated optical fibers include six large air channels around a large ring core whose thickness varies from 3.5 µm to 1.3 µm depending on the fiber sample. As shown above, this topology may increase the interaction area by at least one order of magnitude (compared to other reported optical fibers). In addition, cancellation of light localization at the intersections of the silica struts has been demonstrated, which allows the optical isolation of the annular ring core from the silica struts (which is a source of parasitic light interference phenomena). FIG. 12 is a photograph showing the near field intensity distribution of light at an end of an optical fiber with a ring core according to various embodiments. The photograph is taken by a charged coupled device (CCD) camera. As shown in FIG. 12, the light propagates only in the ring core, similar to the idealistic configuration of a silica ring suspended in the air used in the simulations.

Ring core fibers with bigger core diameters and thinner dielectric core wall thickness have also been fabricated. FIG. 13 shows scanning electron microscopy (SEM) images of traverse cross-section of the optical fibers according to various embodiments. The rings are thinner or equal to the thickness used in the simulations. This demonstrates fiber sensors with potentially any desired dimensions may be formed.

In contrast to a small solid core, the ring core shape may not be adapted to a Gaussian laser beam. In order to improve light coupling efficiency of the beam into the ring core and the collection of the beam from the ring core, the perimeter of the ring core at one or both ends of the fibers may be reduced. The ring core may even be completely collapsing to a solid core. By doing so, the coupling of light into the optical fiber and collection of light (e.g. SERS signal) from the optical fiber may be more efficient.

The abovementioned desired results may be achieved by tapering one or both ends of the fiber with post-processing techniques. By doing so, the diameter of the ring-core may be greatly reduced in order to obtain a better overlap between the laser beam and the core at one or both ends of the fiber. Then, the light may remain confined in the core along the transition end portion(s) as well as in the middle portion of the fiber.

Figure 14:
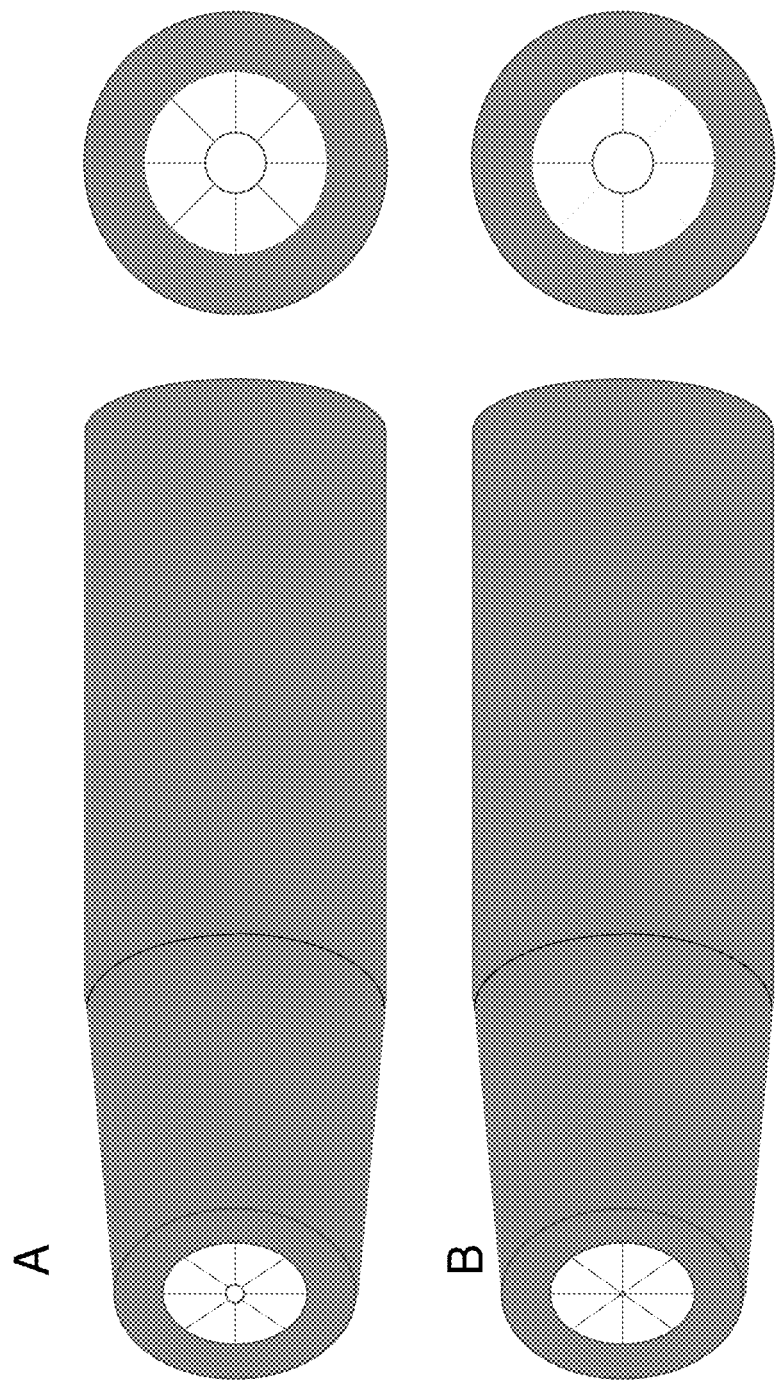
FIG. 14 shows schematics of (A) an optical fiber with an end portion in which the diameter of the dielectric core wall is reduced according to embodiments; and (B) an optical fiber with an end portion in which the dielectric core wall tapers to form a solid core according to various embodiments.
Figure 15:
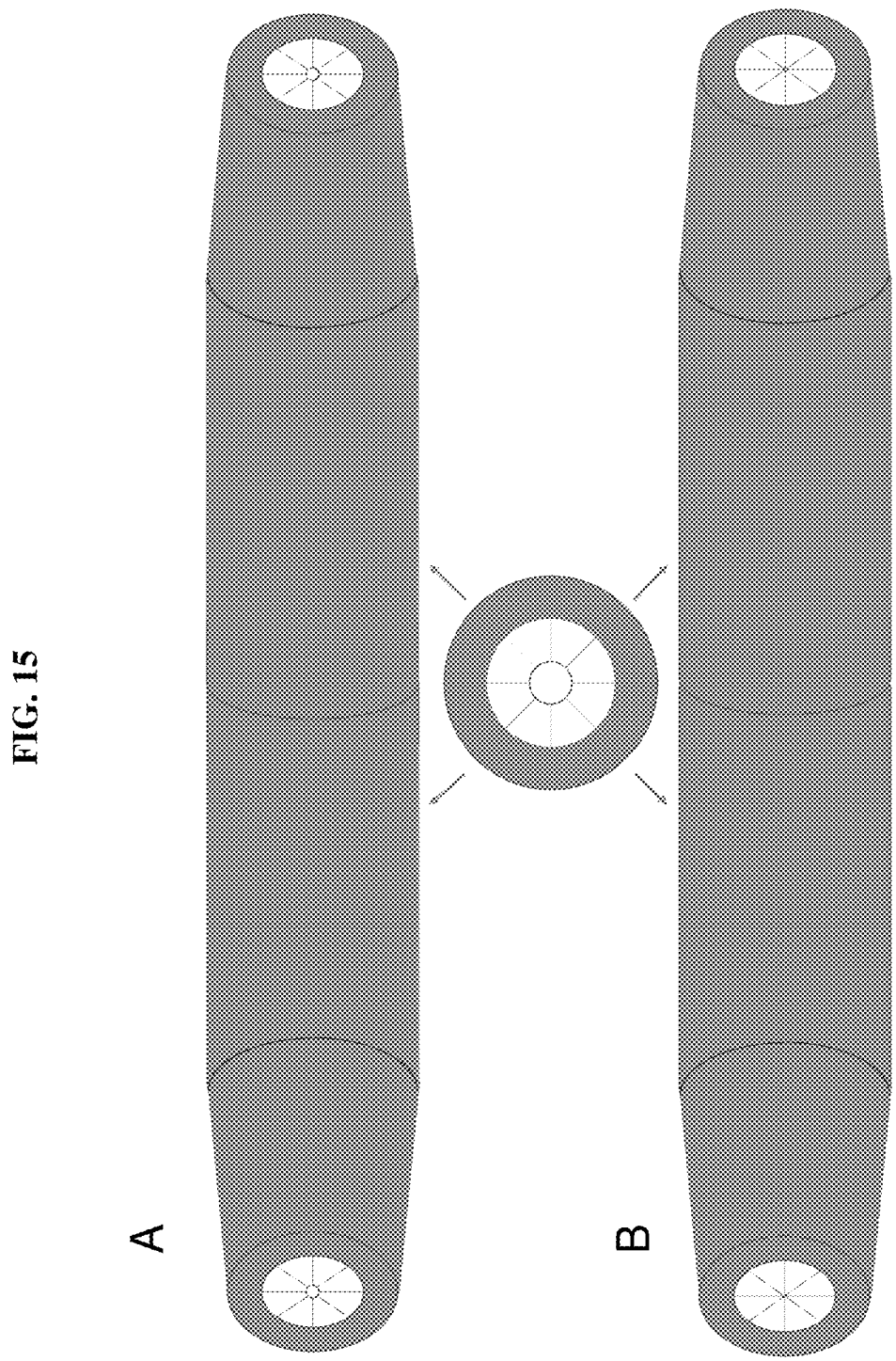
FIG. 15 shows schematics of (A) an optical fiber with both end portions in which the diameter of the dielectric core wall is reduced according to embodiments; and (B) an optical fiber with both end portions in which the dielectric core wall tapers to form a solid core according to various embodiments.

FIG. 14 shows schematics of (A) an optical fiber with an end portion in which the diameter of the dielectric core wall is reduced according to embodiments; and (B) an optical fiber with an end portion in which the dielectric core wall tapers to form a solid core according to various embodiments. FIG. 15 shows schematics of (A) an optical fiber with both end portions in which the diameter of the dielectric core wall is reduced according to embodiments; and (B) an optical fiber with both end portions in which the dielectric core wall tapers to form a solid core according to various embodiments. As shown in FIG. 15, the middle portion of the optical fibers have a large diameter, while the end portions of the optical fibers may be reduced or may form the solid core.

Figure 16:
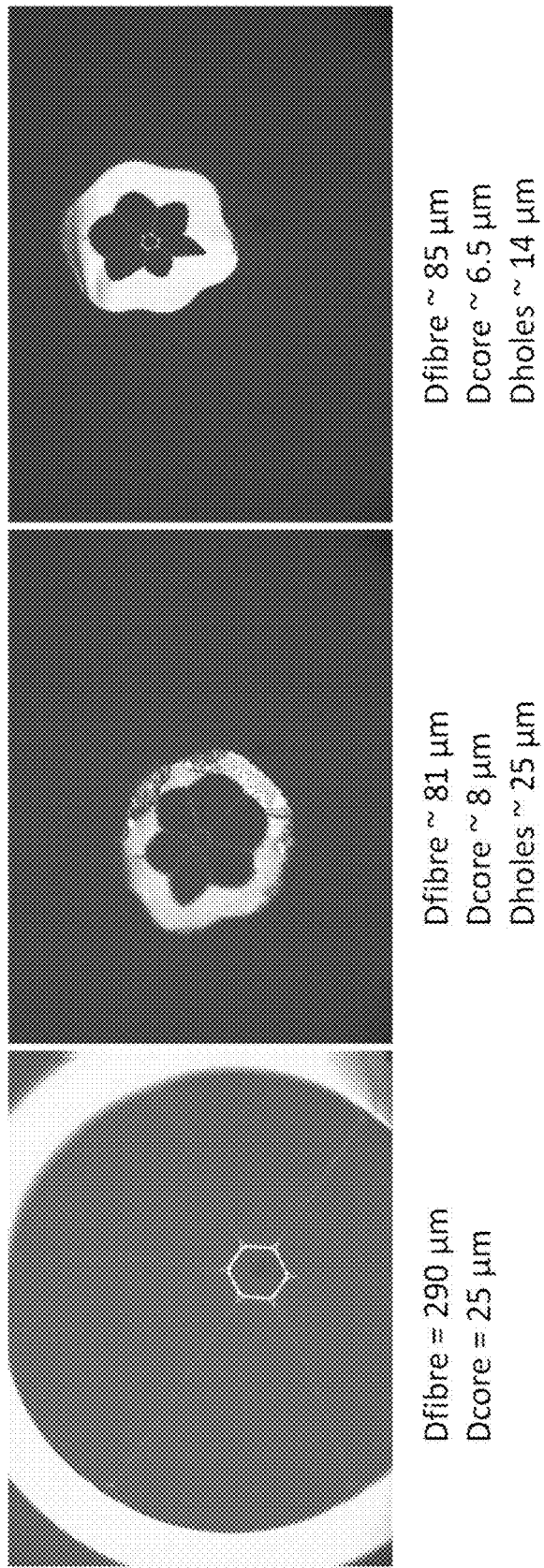
FIG. 16 shows microscope photographs of cross-sections of fabricated optical fibers before (left) and after tapering (middle and right) according to various embodiments.

Several samples have been fabricated by using a post-processing bench based on a carbon dioxide ($CO_2$) laser. Photographs of transverse sections end portion of the optical fiber before and after tapering are shown in FIG. 16. FIG. 16 shows microscope photographs of cross-sections of fabricated optical fibers before (left) and after tapering (middle and right) according to various embodiments.

In these examples of tapered fibers, the ring-core diameter may be reduced from 25 µm to 7 µm. The channels may be large enough to allow analyte infiltration into the optical fiber.

A SERS based method has used to test the sensing performance of the fabricated optical fibers. Gold nanoparticles anchored on the inner surface of the fiber channel may enable the direct use the fiber samples for SERS based bio-chemical sensing. The SERS spectra of a standard Raman reporter molecule, Aminothiophenol (ATP) have been successfully measured with a Raman spectrometer from these optical fibers of different sizes as shown in FIGS. 17A-B. FIG. 17A is a plot comparing the surface enhanced Raman spectroscopy (SERS) signal intensity (counts) of Aminothiophenol (ATP) measured at 1079 $cm^{-1}$ in backscattered configuration for various ring core optical fibers according to various embodiments. FIG. 17B is a plot comparing the surface enhanced Raman spectroscopy (SERS) signal intensity (counts) of Aminothiophenol (ATP) measured at 1079 $cm^{-1}$ in backscattered configuration for various ring core optical fibers tapered at one end according to various embodiments. FIGS. 17A-B demonstrate the improvement in coupling efficiency into the ring core fiber and the collection efficiency from the ring core fiber due to tapering. Indeed, the SERS signals from the tapered fiber may be at least one order of magnitude larger than that of a non-tapered fiber.

In various embodiments, the shape of the core may be specially designed to increase the surface of interaction between guided light in the core and the leaked (evanescent) light in the channels (holes) for maximum light-analyte interactions to achieve high sensitivity in detection. The shape of the core may include two boundaries. The optical fiber according to various embodiments may be seen as a pipe with a transverse section of a ring or an arbitrary shape. This core may be hold by several dielectric (e.g. glass) struts that define the air-channels. The core may include a dielectric material (e.g. glass or polymer). Light may be guided by total internal reflection mechanism in the core. The portion of light guided in the core may therefore be confined within the dielectric material.

Various embodiments may rely on increasing the surface of the core in contact with the analytes in order to increase the surface of interaction between the light and the analyte. This may be achieved by increasing the perimeter of the core (i.e. the boundaries of the core), as seen in a traverse cross-section of the fiber. This may lead to stronger confinement of light in the core and lower fraction of evanescent light. However, the efficiency of the light-analyte interactions may also depend on the fraction of evanescent light, and attenuation coefficient may be related to the confinement efficiency. Various embodiments may enable precise control of the thickness of the core, which may play a key role in the fraction of evanescent field.

In comparison to our design where the light is guided inside the dielectric, in the hollow-core fibers light propagates in the analyte (air, gas or liquid) filled within the hollow-core. The hollow-core fiber offers complete light-analyte interaction over the core surface and along the fiber length. However, the interactions are limited by the absorption coefficient of the analyte, the attenuation coefficient of the light yielded by guiding mechanism (ex. Bandgap or anti-resonant), and by limited transmission windows. In our case, where the light is guided by total internal reflection mechanism, the light-analyte interactions are realized by the fraction of light evanescing outside the core (dielectric material) enabling stronger light-analyte interactions in the vicinity of the core and longer length of light-analyte interactions.

In various embodiments, the core, as well as the connecting struts may be carefully designed to confine light by total internal reflection mechanism only in the core (i.e. with a portion of light within the dielectric strip and with an evanescent portion). This quality of light confinement may not be possible in conventional hollow-core fibers. As shown in FIG. 12, the measured intensity of light in the optical fiber according to various embodiments is well confined in the core without leakage into the struts, and without parasitic confinements at the connections between the struts and the core. This may be achieved by slightly decreasing the thickness of the struts compared to the thickness of the core, and by avoiding the formation of dielectric closed apexes at the connections between the struts and the core. A dielectric closed apex may be a joint or intersection between a strut and the core dielectric wall, wherein the joint has a thickness greater than a thickness of the strut, and greater than a thickness of the core dielectric wall. Various embodiments may be different to conventional hollow-core fibers, and conventional fibers with ring-core shape surrounding an air-channel, in which the quality of light confinement and its evanescent fraction are not considered.

Various embodiments may include a thin dielectric strip or core wall in the shape of a ring or an arbitrary shape. The thickness of the core wall may be carefully designed for controlling the fraction of evanescent light. The core wall may be held by several dielectric struts that also delimit the channels around the core. These struts may have to be carefully designed for not interfering with the light confined in the core wall. The struts may be required to keep the light guided only in the core wall, isolated from the struts for maintaining a good confinement quality. If the struts and their connections to the core wall are not correctly designed, the light may leak into the struts and/or be confined in closed dielectric apexes formed at the junction of the struts and the core, leading to additional losses (larger attenuation coefficient), reduction of the fraction of evanescent light, and uncontrolled and parasitic light confinements. In various embodiments, the optical fiber may be an opto-fluidic fiber. The pre-functionalized fibers may act as biopsy needles that enable one-step sample collection and testing for biomarkers without any sample preparation. Various embodiments may be fully compatible with biofluid analysis concept in a multiple channel/liquid, gas core SERS, fluorescence active PCF probe. The fiber may be pre-functionalized with chemical, metallic, biological semiconductor, dielectric materials (in two dimensional nanostructures, e.g. nanolayers or three-dimensional nanostructures.). Non-destructive monitoring of biomarkers in biofluids at pico-to-femto-molarity (pM-fM) concentrations with nanoliters (nL) sample volumes.

In an optical fiber according to various embodiments, each of the plurality of supports may form a secondary hollow space or open apex with the dielectric core wall.

The ring core of an optical fiber, e.g. a ring core fiber (RCF), according to various of embodiments may be tens of micrometers large. In order to determine whether the open apex or "cores" of the optical fiber would produce similar Raman signal, laser light is focused directly onto each of them using 20× and 50× objectives and the resulting response is monitored. For both objectives, the focused laser spot is only few micrometers wide, which enables only one "core" of the ring to be investigated at a time. This is an optional way of use of a RCF that does not correspond to the intended excitation technique.

Figure 18:
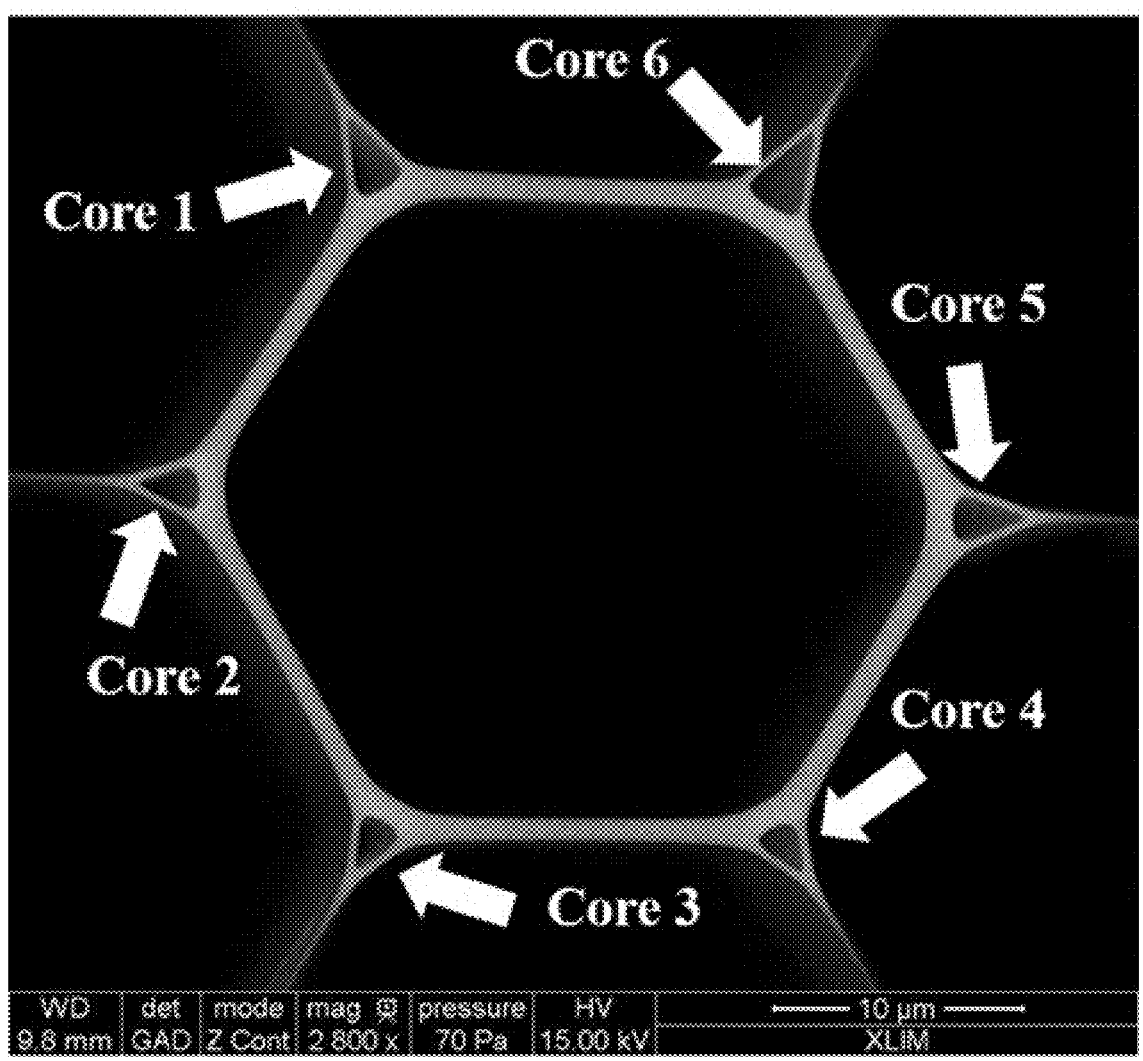
FIG. 18 is a scanning electron microscopy image (SEM) of the ring core fiber (RCF) according to various embodiments.

FIG. 18 is a scanning electron microscopy image (SEM) of the ring core fiber (RCF) according to various embodiments. "Cores" 1 to 6 are labelled in FIG. 18 for clarity.

The RCF sample is prepared by anchoring gold nanoparticles (Au NPs) onto its inner walls. Then, a solution of 100 µM 2 naphthalenethiol (2-NT) is pumped into the optical fiber. The molecules of 2-NT are bound to immobilized Au NPs. The fiber is dried and laser is focused on the first "core" of the RCF (see FIG. 18) using 20× or 50× objective. Four measurements are taken and the average Raman intensity (RI) is calculated. Similar steps are taken for the five other cores, and the variation of the average RIs across the six cores is compared by calculating the relative standard deviation (RSD) across the six cores. The results are presented in FIG. 19A-B and Table 1.

Figure 19A:
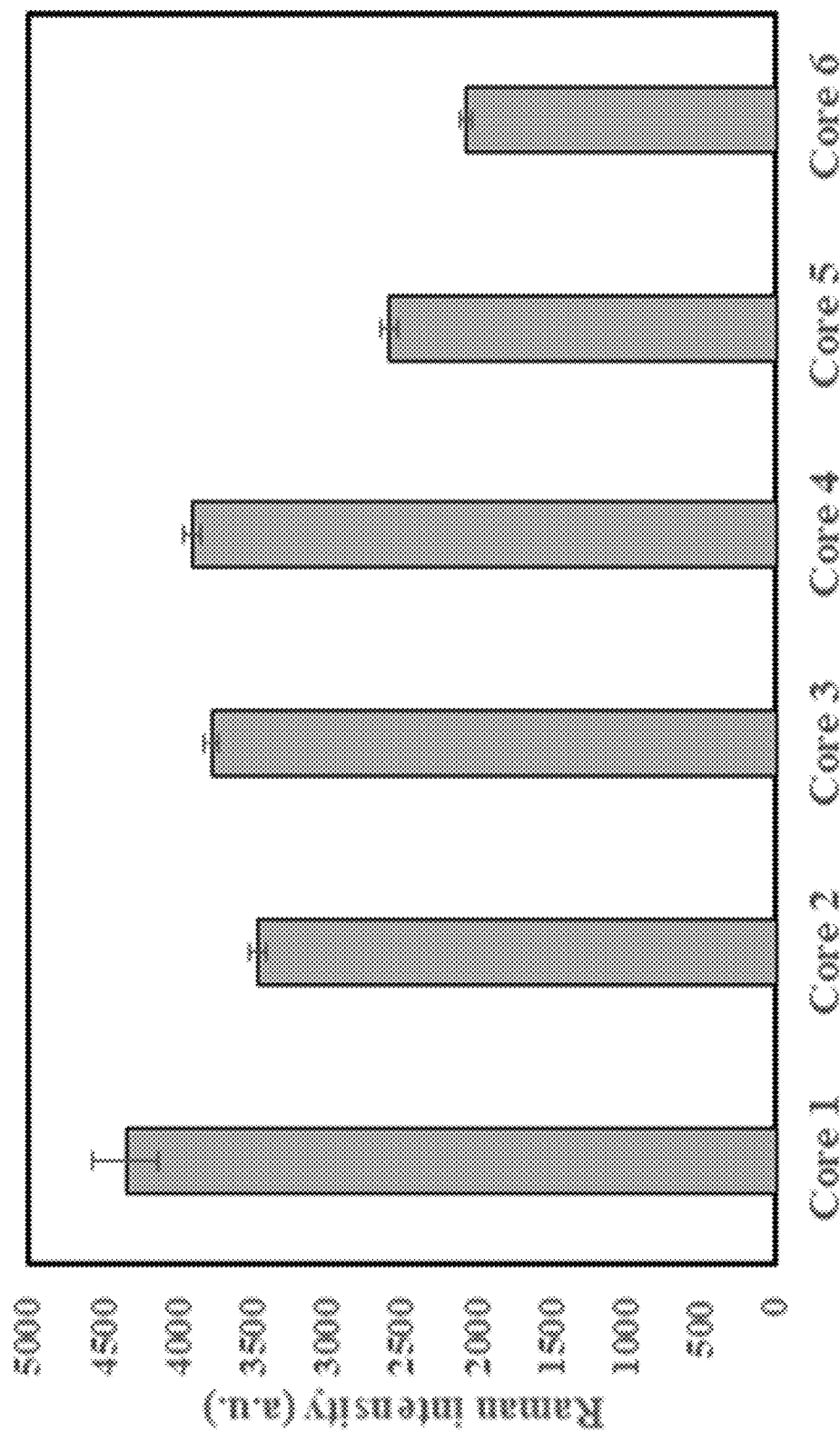
FIG. 19A is a plot comparing the Raman intensities (in arbitrary units or a.u.) using 20× objective at different "cores" of the optical fiber according to various embodiments.

FIG. 19A is a plot comparing the Raman intensities (in arbitrary units or a.u.) using 20× objective at different "cores" of the optical fiber according to various embodiments. FIG. 19B is a plot comparing the Raman intensities (in arbitrary units or a.u.) using 50× objective at different "cores" of the optical fiber according to various embodiments.

Table 1 shows:

TABLE 1

Raman intensities (RIs) obtained for the six cores of a ring core fiber with 20X and 50X objectives.

| 20X objective | | 50X objective | |
|---|---|---|---|
| Core | Average RI (a.u.) | Core | Average RI (a.u.) |
| 1 | 4351 | 1 | 19590 |
| 2 | 3464 | 2 | 17440 |
| 3 | 3776 | 3 | 10657 |
| 4 | 3911 | 4 | 20764 |
| 5 | 2587 | 5 | 11427 |

TABLE 1-continued

Raman intensities (RIs) obtained for the six cores of a ring core fiber with 20X and 50X objectives.

| 20X objective | | 50X objective | |
|---|---|---|---|
| Core | Average RI (a.u.) | Core | Average RI (a.u.) |
| 6 | 2070 | 6 | 7647 |
| RSD | 25.7% | RSD | 36.9% |

As shown above, the calculated RSD values are rather high (25.7% for 20× objective and 36.9% for 50× objective), which indicates that each core of the RCF exhibits different RI. These large variations from one core to the other illustrates the necessity to excite the entire ring instead of focusing the light on only one core.

Another important characteristic of a SERS-based photonic crystal fiber (PCF) sensor may be its ability to produce a linear response when tested with different concentrations of analyte. This may be of tremendous importance as it allows determining the concentration of unknown samples once the calibration curve is established.

Gold nanoparticles (Au NPs) are immobilized inside four ring core fibers (RCFs). Then, solutions of 4 aminothiophenol (4-ATP) with different concentrations: 1 μM, 10 μM, 100 μM and 1 mM are then pumped into each fiber. The molecules of 4-ATP become bound to the Au NPs and the fibers are dried. For a given RCF, light is focused on three of its "cores" successively. Three measurements are taken per core, and the average RI per core is calculated. Then, the Ms obtained for the three cores are then averaged in order to have the average RI per fiber. The results are presented in FIG. 20 and Table 2.

Figure 20:
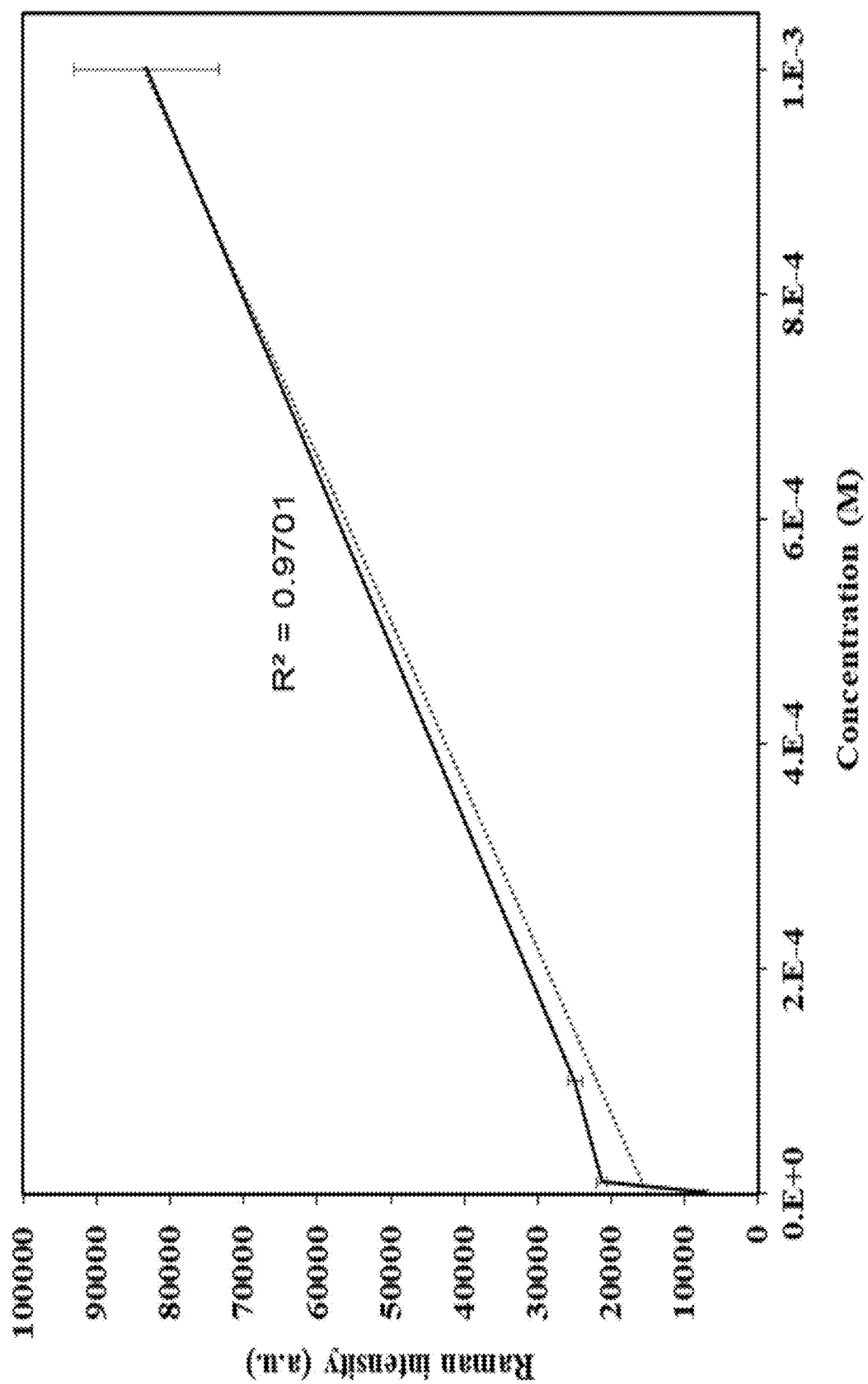
FIG. 20 is a plot of Raman intensity (in arbitrary units or a.u.) as a function of concentration (in moles per liter or M) illustrating the calibration curve of Raman intensity exhibited by the optical fiber according to various embodiments with increasing 4 Aminothiophenol (4-ATP) concentrations.

FIG. 20 is a plot of Raman intensity (in arbitrary units or a.u.) as a function of concentration (in moles per liter or M) illustrating the calibration curve of Raman intensity exhibited by the optical fiber according to various embodiments with increasing 4 aminothiophenol (4-ATP) concentrations.

Table 2 shows:

TABLE 2

Average RIs per fiber and RSD obtained for different concentrations of ATP

| ATP concentration (M) | Average RI per fiber (a.u.) | RSD |
|---|---|---|
| 1.E−3 | 83250 | 12% |
| 1.E−4 | 24887 | 4% |
| 1.E−5 | 21230 | 3% |
| 1.E−6 | 7228 | 4% |

As shown above, the RCF sensor exhibits an excellent linear response with the concentration of ATP. FIG. 20 indicates an $R^2$ value of 0.97.

The performance of the ring core fiber (RCF) is also compared to an existing SERS-based suspended core photonic crystal fiber (SuC-PCF) with 3.5 μm core using the intended excitation technique, i.e. the entire ring is excited. For a proper comparison, the same setup and conditions are used for each fiber, and the intensity of the 1380 $cm^{-1}$ peak of 2 naphthalenethiol (2-NT) is monitored for each fiber. The experiment is repeated several times in order to confirm the results in FIG. 21 and Table 3.

Figure 21:
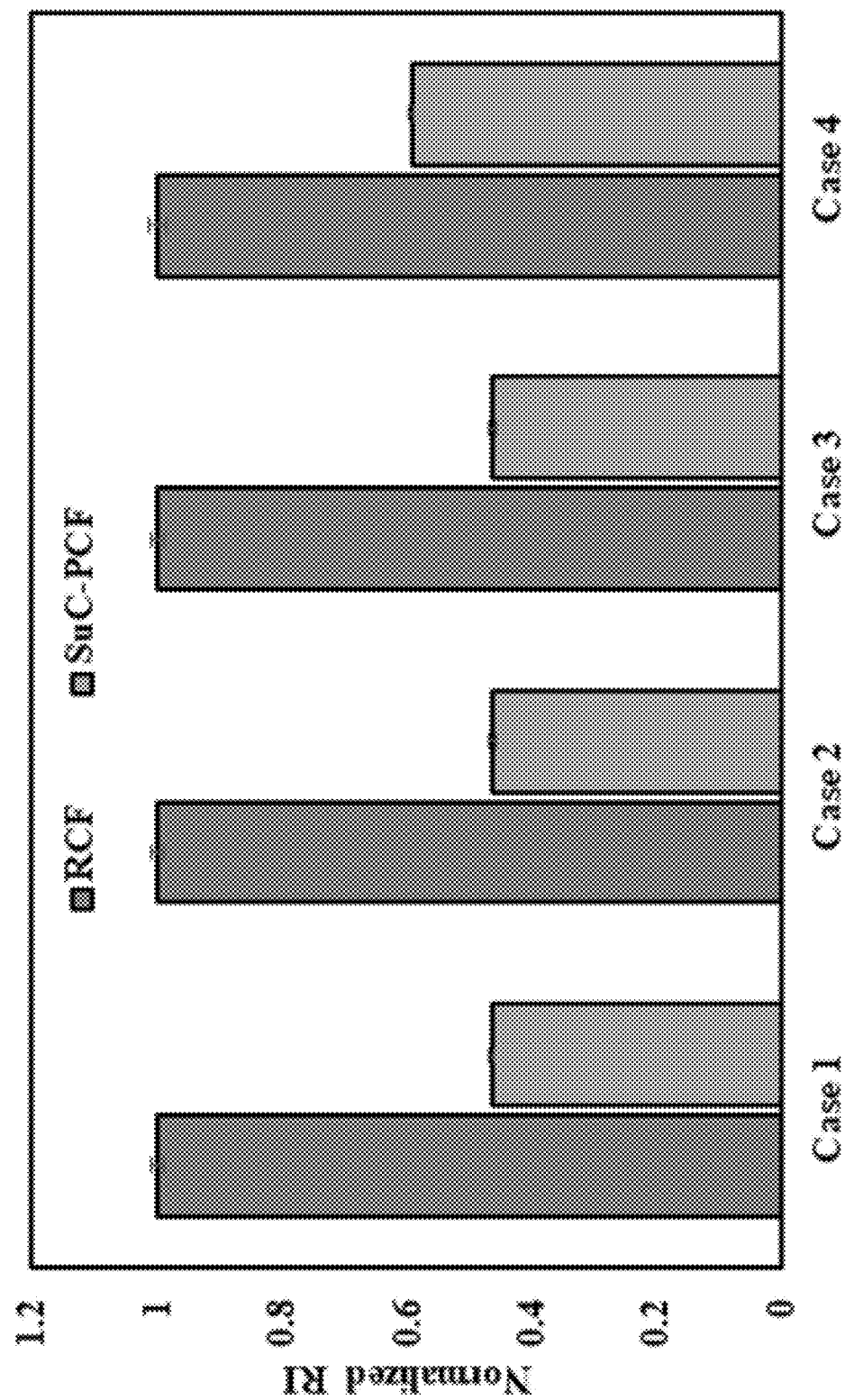
FIG. 21 is a plot of normalized Raman intensity (in arbitrary units or a.u.) comparing the ring core fiber (RCF) according to various embodiments and the existing suspended core photonic crystal fiber (SuC-PCF).

FIG. 21 is a plot of normalized Raman intensity (in arbitrary units or a.u.) comparing the ring core fiber (RCF) according to various embodiments and the existing suspended core photonic crystal fiber (SuC-PCF). The four cases may be done independently in order to demonstrate the reliability of the results.

Table 3 shows:

TABLE 3

Normalized average RI and relative standard deviation for each tested fiber. For each case, the average intensity is normalized based on the highest intensity of the two samples in order to compare them.

| Case | Fibers | Normalized average RI (a.u.) | Relative standard deviation |
|---|---|---|---|
| 1 | RCF | 1.00 | 0.84% |
|   | SuC-PCF | 0.47 | 0.97% |
| 2 | RCF | 1.00 | 0.87% |
|   | SuC-PCF | 0.46 | 1.28% |
| 3 | RCF | 1.00 | 0.86% |
|   | SuC-PCF | 0.46 | 1.32% |
| 4 | RCF | 1.00 | 1.38% |
|   | SuC-PCF | 0.59 | 0.70% |

It can be seen that the RCF design according to various embodiments improves the sensitivity of SERS-based PCF sensors as the RCF design exhibits Ms at approximatively twice higher compared to the SuC-PCF. Based on the preliminary results, the RCF may improve the sensitivity of SERS-based fiber sensors due to the increased interaction surface. This is of tremendous importance as it validates the original hypothesis and simulations that led to the creation of the fiber design according to various embodiments. In addition, the RCF parameters may be further optimized. For instance, the size of the ring may be enlarged to further increase the area of interaction. The thickness of the ring may also be optimized in order to find the best balance between the amount of light interacting with the analyte and the losses from plasmonic nanoparticles. These two modifications may increase the interactions between the excitation light and the analyte, resulting in a stronger Raman signal and therefore, in further improved sensitivity for the RCF sensors. This in turn will result in a sensor with better sensing performances than the actual best SERS-based PCF sensors, confirming the interest of improving the actual used designs and that the design as described herein according to various embodiments may very well be the future of not only SERS sensing but also optical sensing in general.

Figure 22A:
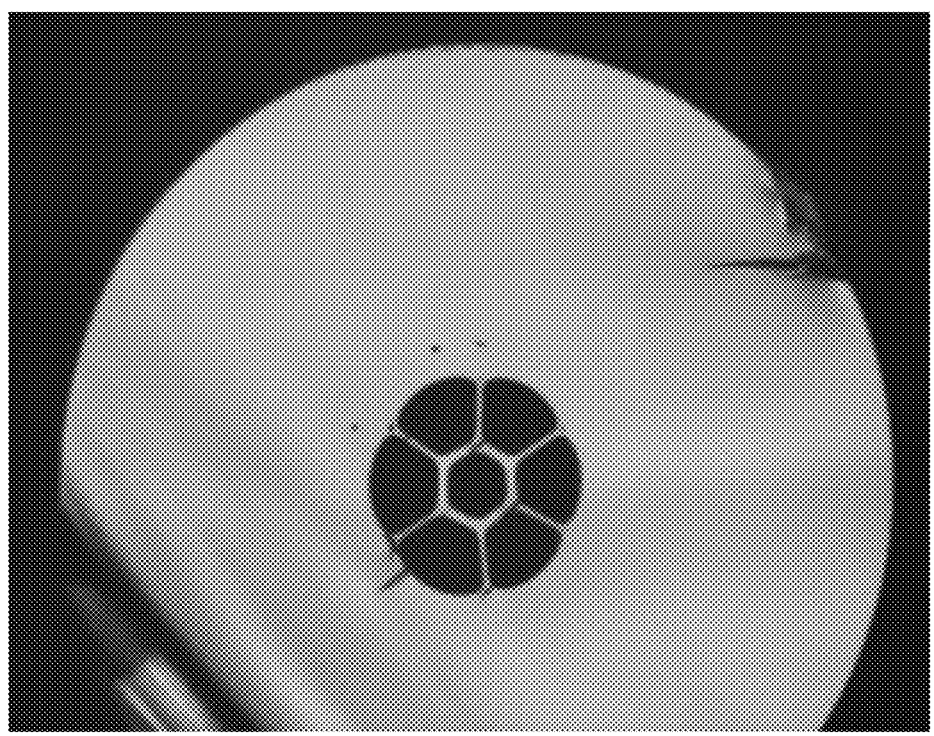
FIG. 22A shows an image of a ring core fiber having an outside diameter of 290 µm, a ring diameter of 20.5 µm, and a dielectric core wall thickness of 3.5 µm according to various embodiments.
Figure 22B:
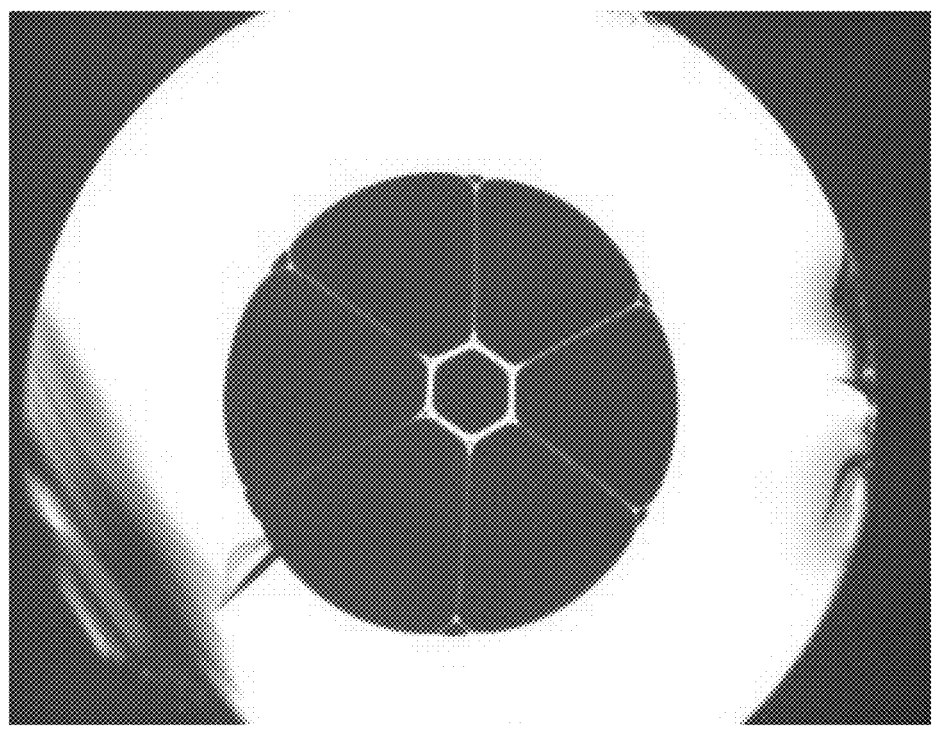
FIG. 22B shows an image of a ring core fiber having an outside diameter of 290 µm, a ring diameter of 26.5 µm, and a dielectric core wall thickness of 1.8 µm according to various embodiments.
Figure 22C:
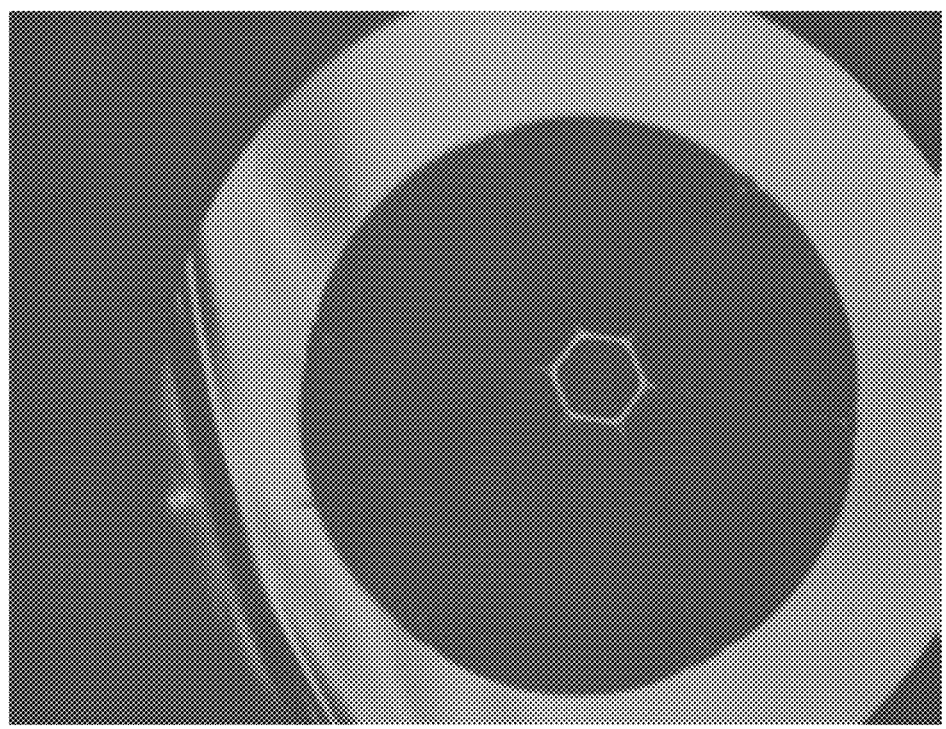
FIG. 22C shows an image of a ring core fiber having an outside diameter of 290 µm, a ring diameter of 27 µm, and a dielectric core wall thickness of 1.6 µm according to various embodiments.
Figure 22D:
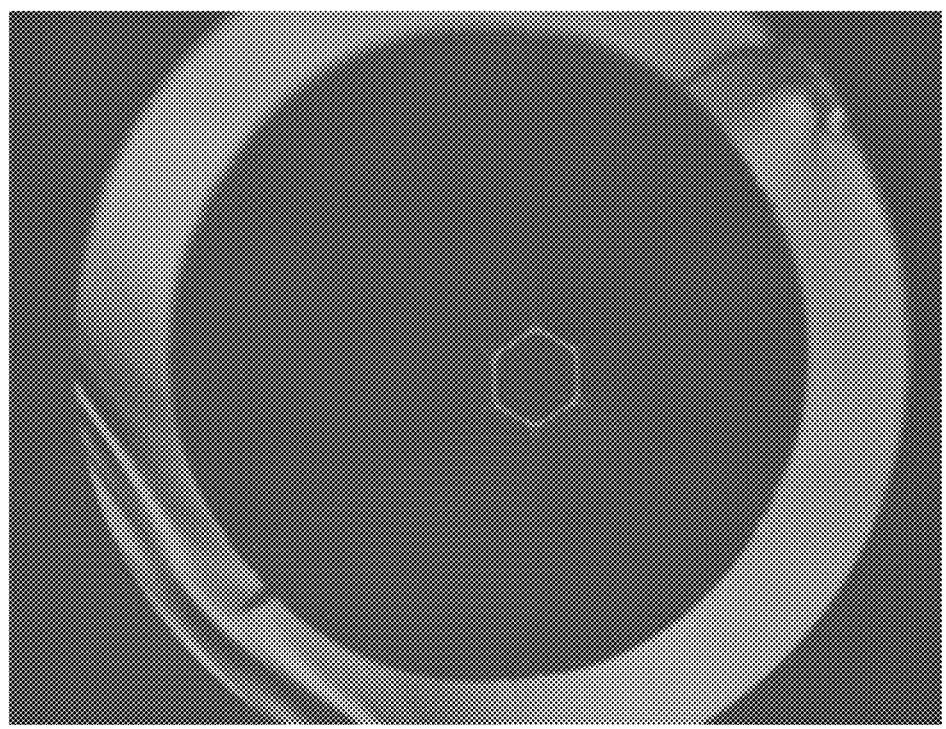
FIG. 22D shows an image of a ring core fiber having an outside diameter of 290 µm, a ring diameter of 29 µm, and a dielectric core wall thickness of 1.1 µm according to various embodiments.
Figure 22E:
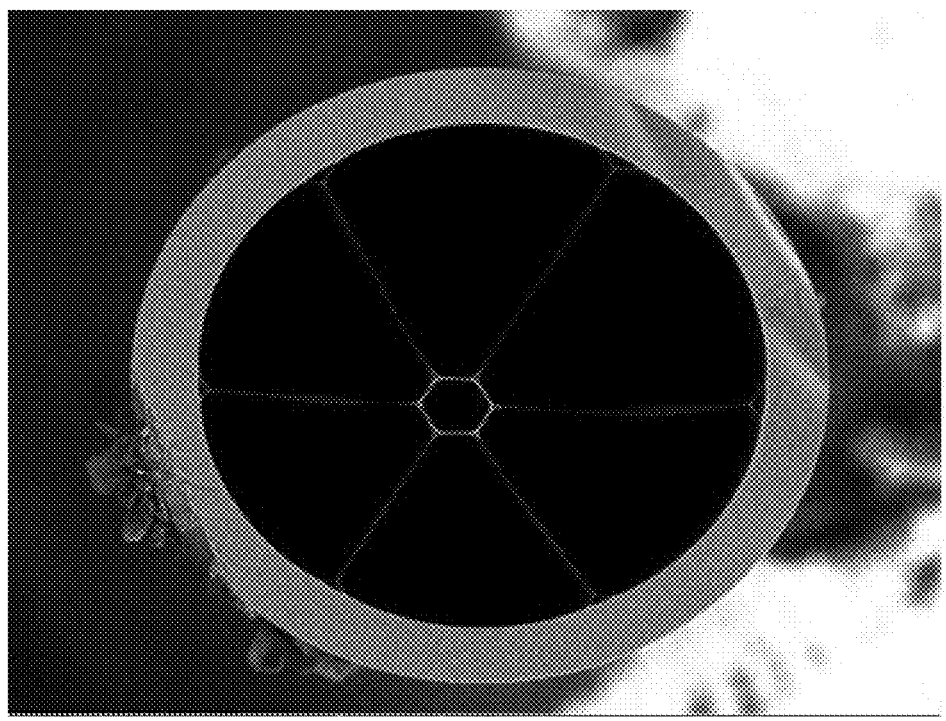
FIG. 22E shows an image of a ring core fiber having an outside diameter of 290 µm, a ring diameter of 27 µm, and a dielectric core wall thickness of 0.94 µm according to various embodiments.
Figure 22F:
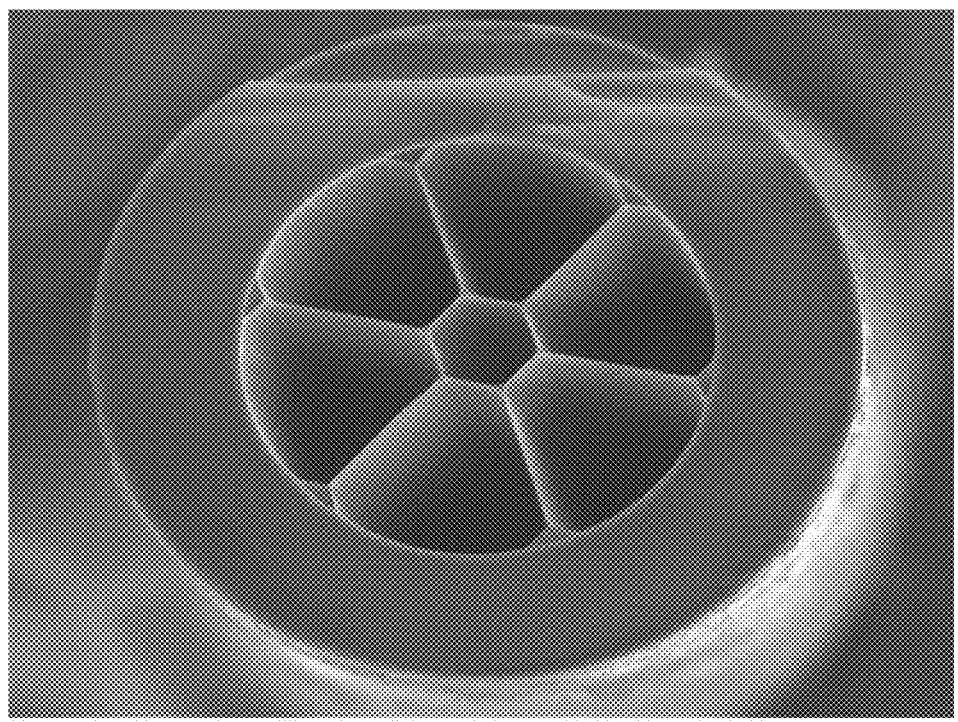
FIG. 22F shows an image of a ring core fiber having an outside diameter of 297 µm, a ring diameter of 40 µm, and a dielectric core wall thickness of 0.4 µm according to various embodiments.
Figure 22G:
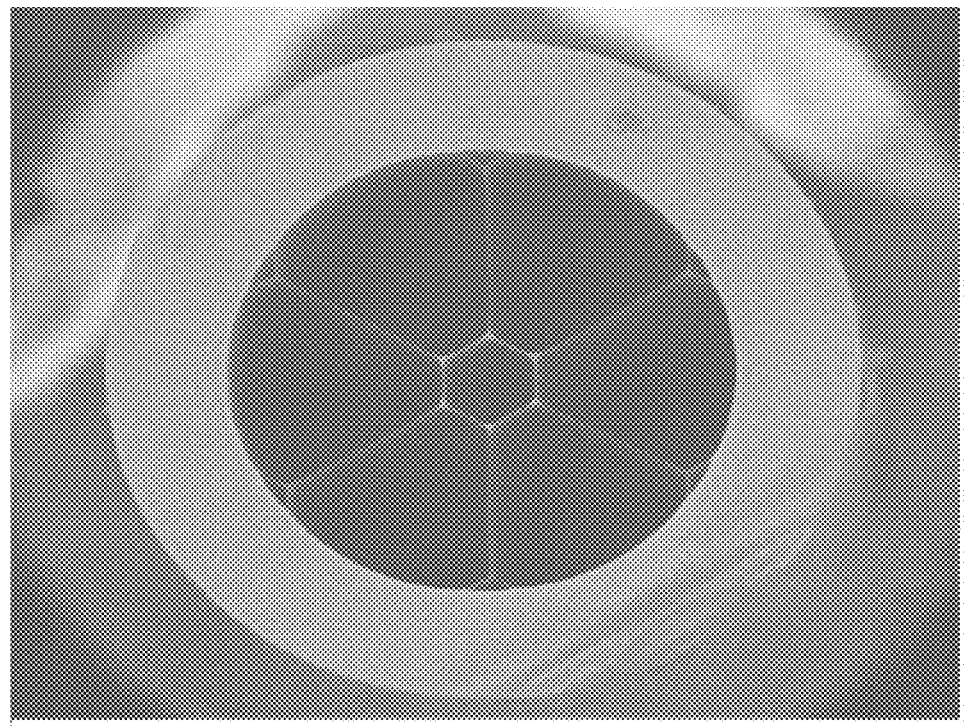
FIG. 22G shows an image of a ring core fiber having an outside diameter of 390 µm, a ring diameter of 49 µm, and a dielectric core wall thickness of 0.5 µm according to various embodiments.
Figure 22H:
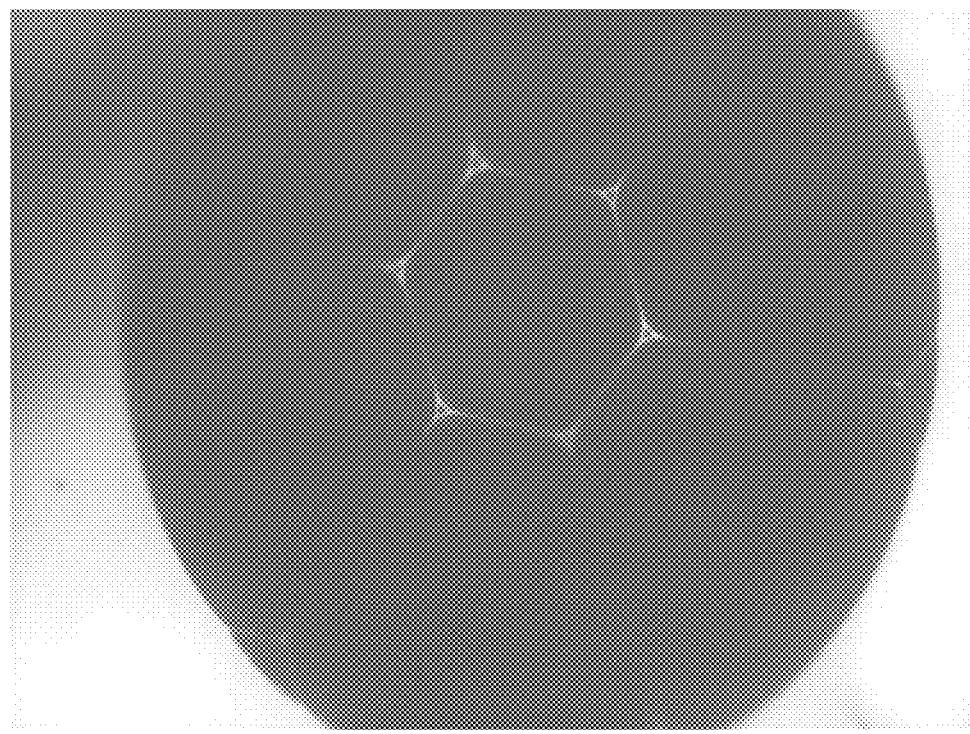
FIG. 22H shows an image of a ring core fiber having an outside diameter of 620 µm, a ring diameter of 96 µm, and a dielectric core wall thickness of 0.4 µm according to various embodiments.
Figure 22I:
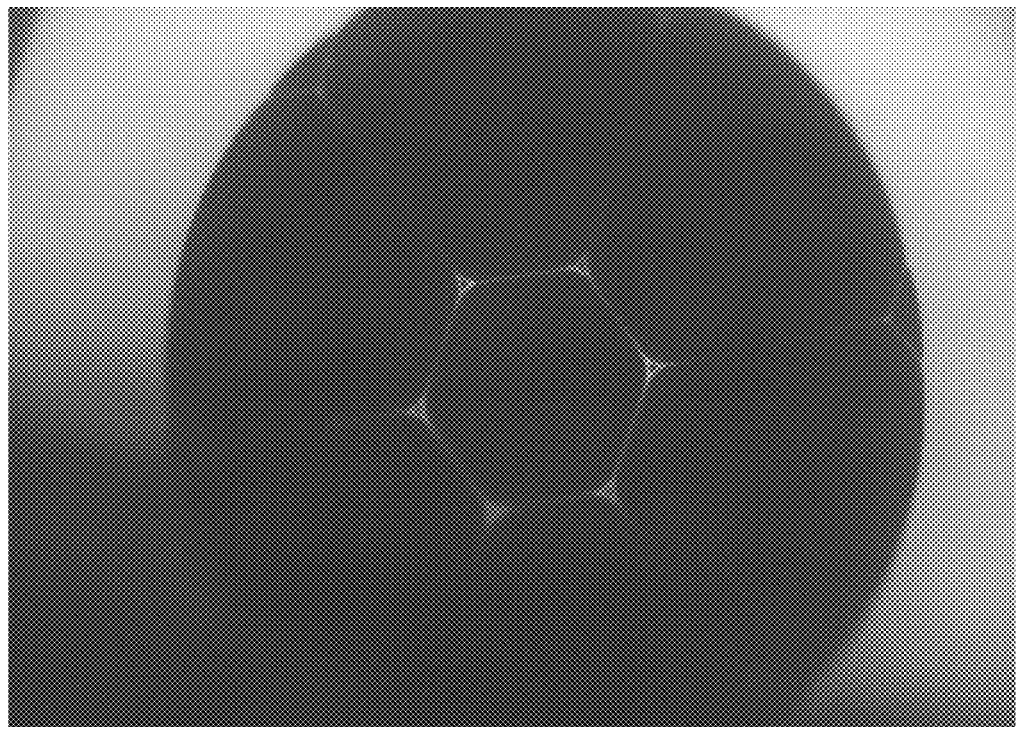
FIG. 22I shows an image of a ring core fiber having an outside diameter of 580 µm, a ring diameter of 90 µm, and a dielectric core wall thickness of 0.6 µm according to various embodiments.

FIGS. 22A-I show the principal parameters and an image of different RCF fabricated. FIG. 22A shows an image of a ring core fiber having an outside diameter of 290 μm, a ring diameter of 20.5 μm, and a dielectric core wall thickness of 3.5 μm according to various embodiments. FIG. 22B shows an image of a ring core fiber having an outside diameter of 290 μm, a ring diameter of 26.5 μm, and a dielectric core wall thickness of 1.8 μm according to various embodiments. FIG. 22C shows an image of a ring core fiber having an outside diameter of 290 μm, a ring diameter of 27 μm, and a dielectric core wall thickness of 1.6 μm according to various embodiments. FIG. 22D shows an image of a ring core fiber having an outside diameter of 290 μm, a ring diameter of 29 μm, and a dielectric core wall thickness of 1.1 μm according to various embodiments. FIG. 22E shows an image of a ring core fiber having an outside diameter of 290 μm, a ring diameter of 27 μm, and a dielectric core wall thickness of 0.94 μm according to various embodiments. FIG. 22F shows an image of a ring core fiber having an outside diameter of 297 µm, a ring diameter of 40 µm, and a dielectric core wall thickness of 0.4 µm according to various embodiments. FIG. 22G shows an image of a ring core fiber having an outside diameter of 390 µm, a ring diameter of 49 µm, and a dielectric core wall thickness of 0.5 µm according to various embodiments. FIG. 22H shows an image of a ring core fiber having an outside diameter of 620 µm, a ring diameter of 96 µm, and a dielectric core wall thickness of 0.4 µm according to various embodiments. FIG. 22I shows an image of a ring core fiber having an outside diameter of 580 µm, a ring diameter of 90 µm, and a dielectric core wall thickness of 0.6 µm according to various embodiments.

Figure 23A:
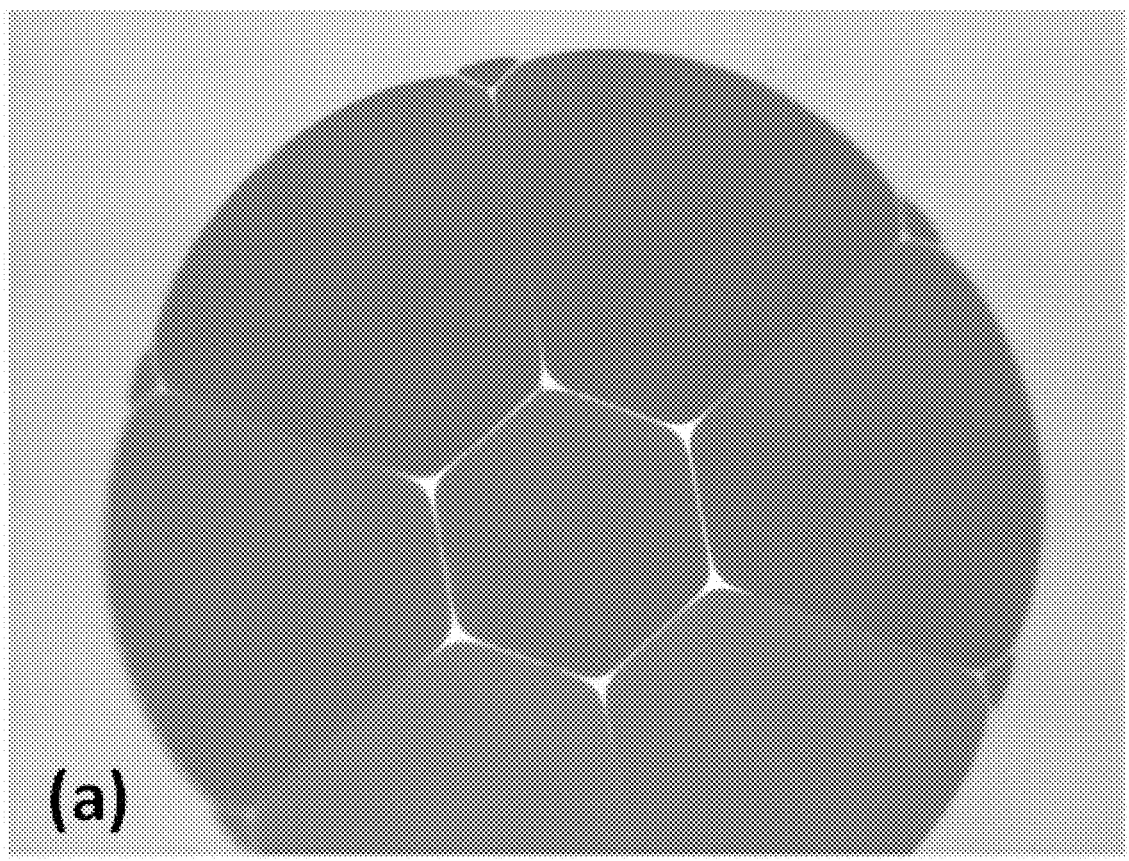
FIG. 23A is a scanning electron microscopy (SEM) image of a conventional 7-holes photonic crystal fiber (PCF) or a hollow-core PCF with closed apexes.
Figure 23B:
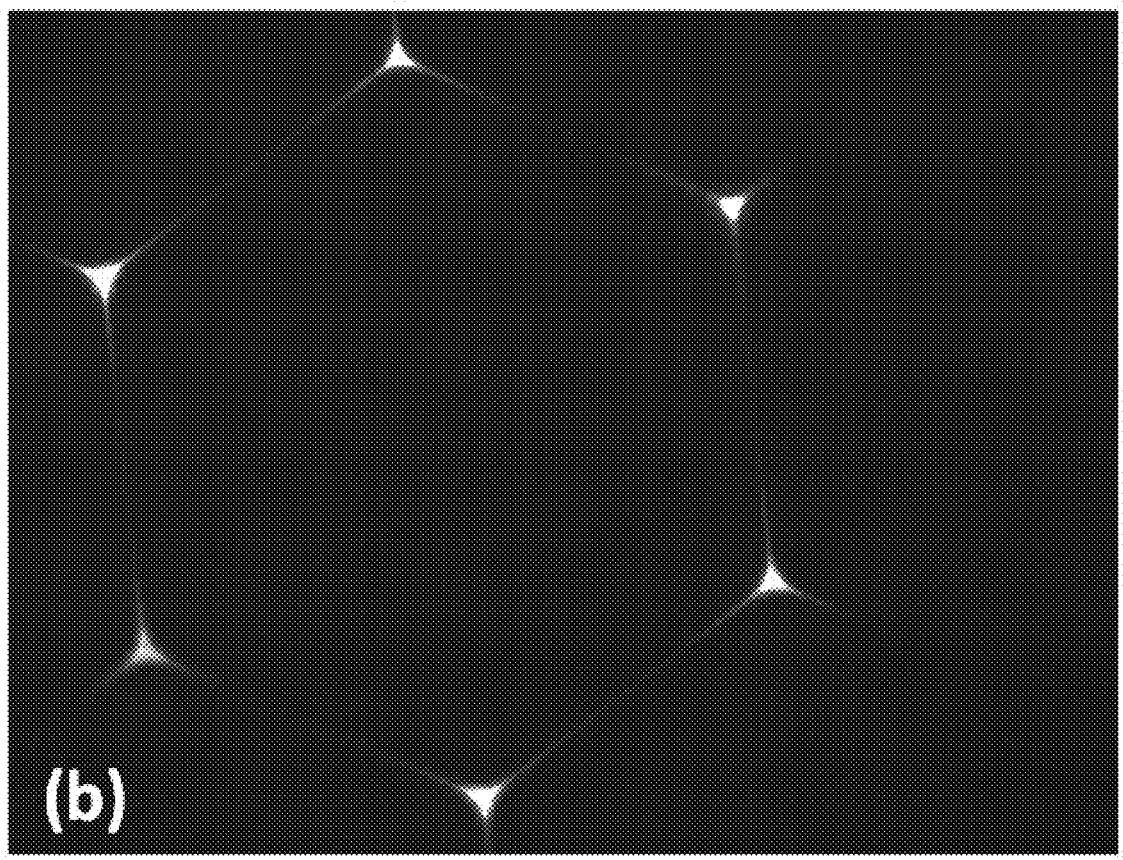
FIG. 23B is an image showing measured output near-field distribution of light propagated through the 7-holes photonic crystal fiber (PCF) shown in FIG. 23A.
Figure 23C:
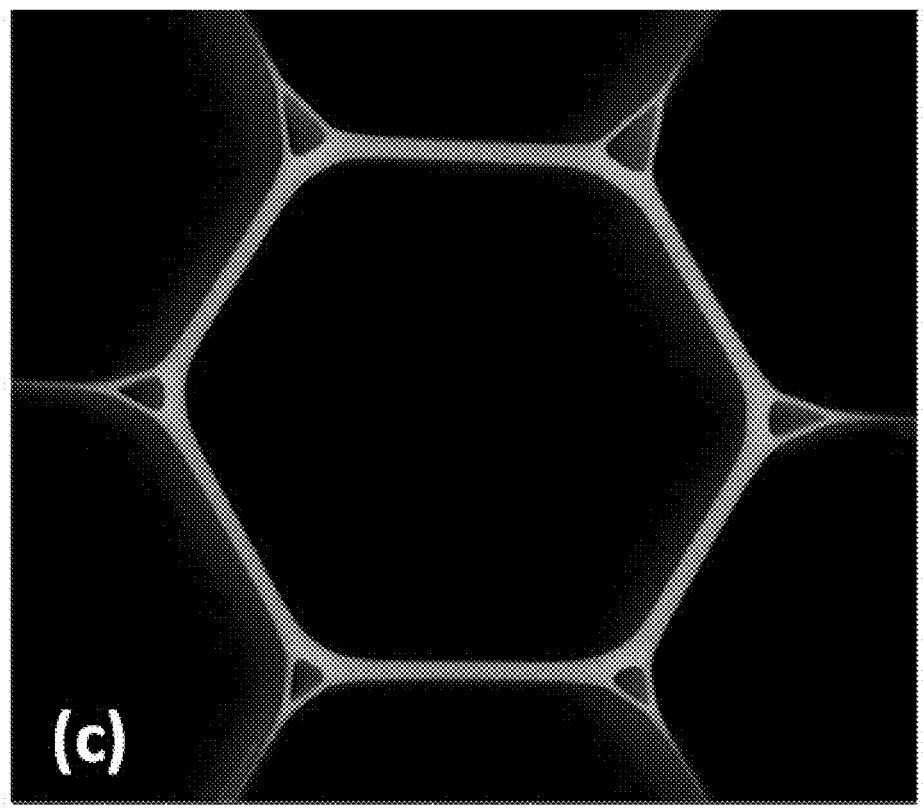
FIG. 23C is a scanning electron microscopy (SEM) image of ring core fiber according to various embodiments.
Figure 23D:
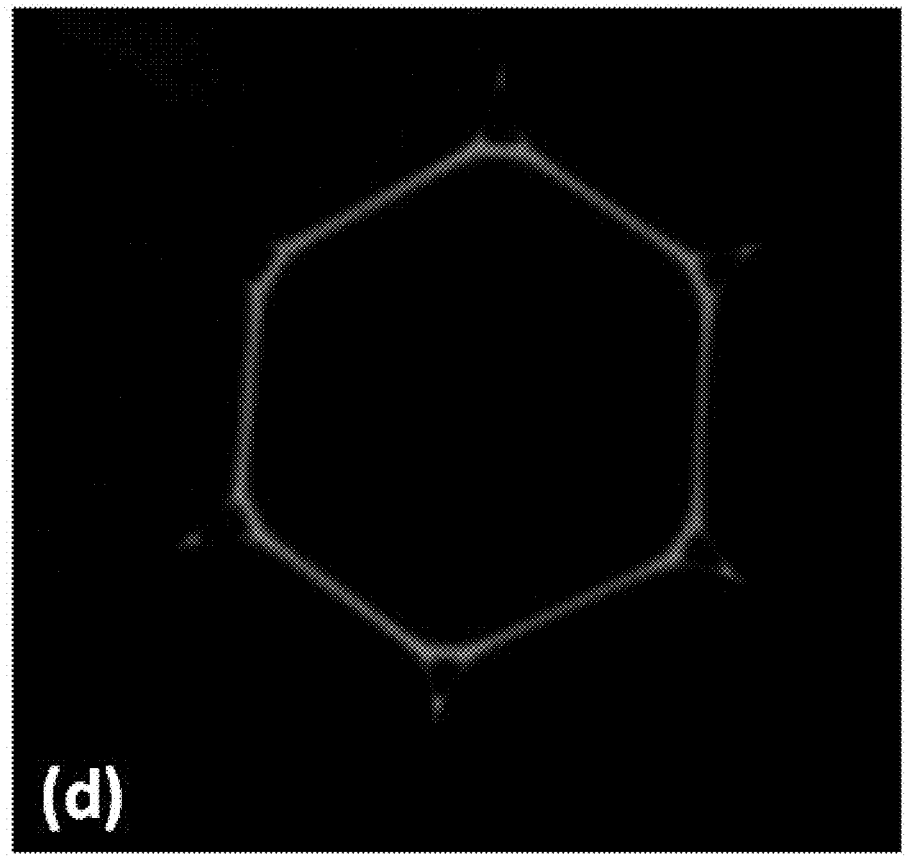
FIG. 23D is an image showing measured output near-field distribution of light propagated through the ring core fiber shown in FIG. 23C according to various embodiments.

FIG. 23A is a scanning electron microscopy (SEM) image of a conventional 7-holes photonic crystal fiber (PCF) or a hollow-core PCF with closed apexes. FIG. 23B is an image showing measured output near-field distribution of light propagated through the 7-holes photonic crystal fiber (PCF) shown in FIG. 23A. FIG. 23C is a scanning electron microscopy (SEM) image of ring core fiber according to various embodiments. FIG. 23D is an image showing measured output near-field distribution of light propagated through the ring core fiber shown in FIG. 23C according to various embodiments.

It may be worth mentioning that in the ring-core fiber, the ring core may be optically isolated from the apexes—silica strut connections that hold the ring-core. In the 7-holes photonic crystal fiber (PCF), the apex at the silica struts connections are closed, leading to light confinement in these closed apex apexes (as shown in FIG. 23B). In contrast, in the optical fiber according to various embodiments, the apexes are open as shown in FIG. 23C, which may cancel light localization at the intersections of the silica struts, thereby allowing the optical isolation of the annular core to the silica struts (which may be a source of parasitic light interference phenomena). As shown in FIG. 23D, the light propagates only in the ring core, similar to the idealistic configuration of a silica ring suspended in the air used in the simulations, yielding larger light-analyte interaction and therefore leading to better sensing performances compared to the PCF design with close apexes.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical fiber for sensing an analyte, the optical fiber comprising:
 a dielectric core wall defining a hollow space;
 a cladding layer surrounding the dielectric core wall and spaced apart from the dielectric core wall; and
 a plurality of supports extending from the cladding layer to the dielectric core wall;
 wherein a thickness of the dielectric core wall is greater than a thickness of each of the plurality of supports;
 wherein the dielectric core wall is configured to carry an optical light for sensing the analyte;
 wherein each of the plurality of supports forms a secondary hollow space or open apex with the dielectric core wall; and
 wherein a joint between each support and the dielectric core wall has a thickness less than or equal to the thickness of each support; and/or
 wherein a joint between each support and the dielectric core wall has a thickness less than or equal to the thickness of the dielectric core wall.

2. The optical fiber according to claim 1, wherein the dielectric core wall comprises a glass material or a polymer material.

3. The optical fiber according to claim 2, wherein the glass material is silica, borosilicate glass, tellurite glass, or chalcogenide glass.

4. The optical fiber according to claim 1, wherein the thickness of the dielectric core wall is any one value selected from a range from 0.1 µm to 5 µm.

5. The optical fiber according to claim 1, wherein the thickness of each of the plurality of supports is any one value selected from a range from 0.05 µm to less than 5 µm.

6. The optical fiber according to claim 1, wherein an inner surface of the dielectric core wall is any one value selected from a range from 3 µm$^2$ to 2×10$^5$ µm$^2$.

7. The optical fiber according to claim 1, wherein each of the plurality of supports is a strut.

8. The optical fiber according to claim 1, wherein the plurality of supports, the dielectric core wall and the cladding layer define multiple holes.

9. The optical fiber according to claim 8, wherein a sum of inner surfaces of the multiple holes is any one value selected from a range from 5 µm$^2$ to 8×10$^5$ µm$^2$.

10. The optical fiber according to claim 1, further comprising:
 a plurality of nanostructures arranged along an inner circumference and an outer circumference of the dielectric core wall.

11. The optical fiber according to claim 1, wherein at least one end portion of the optical fiber is tapered.

12. The optical fiber according to claim 11, wherein a diameter of the dielectric core wall at the at least one tapered end portion of the optical fiber is less than a diameter of the dielectric core wall at a middle portion of the optical fiber.

13. The optical fiber according to claim 11, wherein the dielectric core wall at the at least one tapered end portion of the optical fiber has a solid core.

14. A method of forming an optical fiber for sensing an analyte, the method comprising:
 forming a dielectric core wall defining a hollow space;
 forming a cladding layer surrounding the dielectric core wall and spaced apart from the dielectric core wall;
 forming a plurality of supports extending from the cladding layer to the dielectric core wall;
 wherein a thickness of the dielectric core wall is greater than a thickness of each of the plurality of supports;
 wherein the dielectric core wall is configured to carry an optical light for sensing the analyte;
 wherein each of the plurality of supports forms a secondary hollow space or open apex with the dielectric core wall;
 wherein a joint between each support and the dielectric core wall has a thickness less than or equal to the thickness of each support; and/or
 wherein a joint between each support and the dielectric core wall has a thickness less than or equal to the thickness of the dielectric core wall.

15. The method according to claim 14, wherein at least one end portion of the optical fiber is tapered.

16. The method according to claim 15, wherein a diameter of the dielectric core wall at the at least one tapered end portion of the optical fiber is less than a diameter of the dielectric core wall at a middle portion of the optical fiber.

17. A method of using an optical fiber for sensing an analyte, the method comprising:
- providing the analyte to the optical fiber, wherein the optical fiber comprises a dielectric core wall defining a hollow space, a cladding layer surrounding the dielectric core wall and spaced apart from the dielectric core wall, and a plurality of supports extending from the cladding layer to the dielectric core wall;
- providing an optical light to the dielectric core wall which carries the optical light for sensing the analyte; and
- determining the optical light at an output of the optical fiber;
- wherein a thickness of the dielectric core wall is greater than a thickness of each of the plurality of supports;
- wherein each of the plurality of supports forms a secondary hollow space or open apex with the dielectric core wall;
- wherein a joint between each support and the dielectric core wall has a thickness less than or equal to the thickness of each support; and/or
- wherein a joint between each support and the dielectric core wall has a thickness less than or equal to the thickness of the dielectric core wall.

18. The method according to claim 17, further comprising:
- arranging a plurality of nanostructures along an inner circumference and an outer circumference of the dielectric core wall.

19. The method according to claim 17, wherein the analyte is sensed via absorption spectroscopy, fluorescence-based detection, Surface Plasmon resonance method or Raman spectroscopy.

* * * * *